United States Patent
Mitchell et al.

(10) Patent No.: US 10,556,410 B2
(45) Date of Patent: Feb. 11, 2020

(54) MULTILAYER FILM FOR LABEL AND A METHOD FOR PROVIDING SUCH

(71) Applicant: UPM Raflatac Oy, Tampere (FI)

(72) Inventors: Noel Mitchell, Wuppertal (DE); Matti Manner, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 0 days.

(21) Appl. No.: 14/902,408

(22) PCT Filed: Jul. 12, 2013

(86) PCT No.: PCT/FI2013/050761
§ 371 (c)(1),
(2) Date: Dec. 31, 2015

(87) PCT Pub. No.: WO2015/004316
PCT Pub. Date: Jan. 15, 2015

(65) Prior Publication Data
US 2016/0136935 A1    May 19, 2016

(51) Int. Cl.
*B32B 27/32* (2006.01)
*B32B 27/08* (2006.01)
(Continued)

(52) U.S. Cl.
CPC ............ *B32B 27/325* (2013.01); *B29C 55/06* (2013.01); *B29C 55/08* (2013.01); *B32B 27/08* (2013.01);
(Continued)

(58) Field of Classification Search
CPC .... B65D 33/00; B65D 23/0878; B65D 65/40; G09F 3/04; G09F 3/02; G09F 2003/0257; B32B 27/32; B32B 7/12; B32B 27/325; B32B 27/36; B32B 27/08; B32B 2270/00; B32B 2307/4026; B32B 2307/51; B32B 2307/516; B32B 2307/736; B32B 2519/00; B32B 2250/03; B29C 55/06; B29C 55/08; B29C 63/42; B29C 55/02; C08L 23/08; C08L 23/14; B29L 2031/744;
(Continued)

(56) References Cited

U.S. PATENT DOCUMENTS

| 4,034,131 A | 7/1977 | Rhoads |
| 4,352,849 A | 10/1982 | Mueller |

(Continued)

FOREIGN PATENT DOCUMENTS

| CA | 2178459 A1 | 12/1996 |
| EP | 0763422 A1 | 3/1997 |

(Continued)

OTHER PUBLICATIONS

ARKEMA, LOTRYL 17BA04: Ethylene—Butyl Acrylate copolymer, Jun. 2013, ARKEMA, obtained from http://www.lotryl.com/export/sites/lotryl/.content/medias/down loads/I iteratu re/tds_lotryl_17ba04_2010.pdf.*

(Continued)

*Primary Examiner* — Brian Handville
(74) *Attorney, Agent, or Firm* — Cantor Colburn LLP

(57) ABSTRACT

The invention relates to providing a method for obtaining a multilayer film for thermally inducible shrink labels, products thereof and use of such products.

15 Claims, 4 Drawing Sheets

(51) Int. Cl.
| | |
|---|---|
| *B29C 55/06* | (2006.01) |
| *B29C 55/08* | (2006.01) |
| *B32B 27/36* | (2006.01) |
| *B65D 33/00* | (2006.01) |
| *B29K 21/00* | (2006.01) |
| *B29K 23/00* | (2006.01) |
| *B29K 105/02* | (2006.01) |
| *B29L 31/00* | (2006.01) |
| *G09F 3/02* | (2006.01) |

(52) U.S. Cl.
CPC .............. *B32B 27/32* (2013.01); *B32B 27/36* (2013.01); *B65D 33/00* (2013.01); *B29K 2021/003* (2013.01); *B29K 2023/08* (2013.01); *B29K 2023/12* (2013.01); *B29K 2105/02* (2013.01); *B29K 2995/0049* (2013.01); *B29L 2031/744* (2013.01); *B32B 2250/03* (2013.01); *B32B 2270/00* (2013.01); *B32B 2307/736* (2013.01); *B32B 2519/00* (2013.01); *G09F 2003/0257* (2013.01)

(58) Field of Classification Search
CPC ............ B29K 2023/12; B29K 2023/08; B29K 2021/003; B29K 2105/02
USPC ..................... 428/213, 216, 516; 264/173.16
See application file for complete search history.

(56) References Cited

U.S. PATENT DOCUMENTS

| | | | |
|---|---|---|---|
| 4,762,748 A | 8/1988 | Oberle | |
| 5,691,043 A | 11/1997 | Keller et al. | |
| 5,846,620 A | 12/1998 | Compton | |
| 5,888,660 A | 3/1999 | Landoni et al. | |
| 2002/0068137 A1* | 6/2002 | Paleari | B29C 66/7371 428/34.9 |
| 2002/0192412 A1 | 12/2002 | Satani et al. | |
| 2004/0126518 A1 | 7/2004 | Mendes et al. | |
| 2005/0004390 A1 | 1/2005 | Nakao et al. | |
| 2007/0098933 A1* | 5/2007 | Opuszko | B32B 27/08 428/35.2 |
| 2009/0068486 A1* | 3/2009 | Blackwell | B32B 25/042 428/516 |
| 2011/0065867 A1 | 3/2011 | Keung et al. | |
| 2011/0212338 A1 | 9/2011 | Ambroise | |
| 2016/0136934 A1 | 5/2016 | Mitchell et al. | |
| 2016/0152010 A1 | 6/2016 | Mitchell et al. | |
| 2016/0193815 A1 | 7/2016 | Mitchell et al. | |
| 2017/0174379 A1 | 6/2017 | Mitchell et al. | |

FOREIGN PATENT DOCUMENTS

| | | |
|---|---|---|
| EP | 0844077 A2 | 5/1998 |
| EP | 1300238 A2 | 4/2003 |
| EP | 1632343 A1 | 6/2004 |
| JP | 60187543 | 9/1985 |
| JP | 03013338 | 1/1991 |
| JP | 2001215880 A | 8/2001 |
| JP | 2004066533 A | 3/2004 |
| JP | 2004170468 A | 6/2004 |
| JP | 2005254458 A | 9/2005 |
| JP | 2006116874 A | 5/2006 |
| JP | 2009001007 A | 1/2009 |
| JP | 2010030287 A | 2/2010 |
| JP | 2012111068 A | 6/2012 |
| WO | 2007050605 A2 | 5/2007 |
| WO | 2007050605 A3 | 5/2007 |
| WO | 2007127233 A2 | 11/2007 |
| WO | 2010047906 A1 | 4/2010 |
| WO | 2010117771 A1 | 10/2010 |
| WO | 2015004310 A1 | 1/2015 |
| WO | 2015004311 A1 | 1/2015 |
| WO | 2015004314 A1 | 1/2015 |
| WO | 2015004315 A1 | 1/2015 |
| WO | 2015118212 A1 | 8/2015 |

OTHER PUBLICATIONS

Tampere University of Technology, "Ethylene-Vinyl Acetate Copolymer (EVA)", 2018, obtained from https://www.tut.fi/ms/muo/vert/6_elastomeric_materials/eva.htm (Year: 2018).*
International Search Report dated Mar. 13, 2014; International Application No. PCT/FI2013/050761; International Filing Date Jul. 12, 2013 (6 pages).
International Search Report dated Apr. 24, 2014; International Application No. PCT/FI2013/050759; International Filing Date Jul. 12, 2013 (3 pages).
International Search Report dated Apr. 24, 2014; International Application No. PCT/FI2013/050760; International Filing Date Jul. 12, 2013 (3 pages).
Italian Patent Application No. IT 1999-MI1935; Publication Date Mar. 19, 2001 (abstract only 2 pages).
Written Opinion dated Mar. 13, 2014; International Application No. PCT/FI2013/050761; International Filing Date Jul. 12, 2014 (9 pages).
Written Opinion dated Apr. 24, 2014; International Application No. PCT/FI2013/050759; International Filing Date Jul. 12, 2013 (6 pages).
Written Opinion dated Apr. 24, 2014; International Application No. PCT/FI2013/050760; International Filing Date Jul. 12, 2013 (6 pages).
International Search Report dated Mar. 14, 2014; international Application No. PCT/FI2013/050756; International Filing Date Jul. 12, 2013 (5 pages).
International Search Report dated Mar. 20, 2014; international Application No. PCT/FI2013/050755; International Filing Date Jul. 12, 2013 (3 pages).
Written Opinion dated Mar. 14, 2014; International Application No. PCT/FI2013/050756; International Filing Date Jul. 12, 2013 (8 pages).
Written Opinion dated Mar. 20, 2014; International Application No. PCT/FI2013/050755; International Filing Date Jul. 12, 2013 (4 pages).
Database WPI Week 200435 Thomson Scientific, London, GB: AN 2004-367010 XP002767255, & JP 2004 066533 A (Mitsubishi Plastics Ind Ltd) Mar. 4, 2004 *abstract*.
Database WPI, Week 200569, Thomson Scientific, London, GB; AN 2005-668634 XP002767254, & JP 2005 254458 A (Mitsubishi Plastics Ind Ltd) Sep. 22, 2005 *abstract*.
European Search Report for European Application No. 16205196.5; dated May 26, 2017; 7 pages.
European Search Report for European Application No. 13889281.5; dated Mar. 3, 2017; 11 pages.
Non Final Office Action for U.S. Appl. No. 14/903,151, filed Jan. 6, 2016; dated Sep. 18, 2017; 40 pages.
Final Office Action for U.S. Appl. No. 14/903,151, filed Jan. 6, 2016; dated Mar. 15, 2018; 23 pages.
Non Final Office Action for U.S. Appl. No. 14/902,122 filed Dec. 30, 2015; dated Apr. 6, 2018; 15 pages.

* cited by examiner

MULTILAYER FILM FOR LABEL AND A METHOD FOR PROVIDING SUCH

FIELD OF THE INVENTION

The application relates to a plastic film. In particular, the application relates to a shrinkable plastic film for labelling applications. The application concerns further a method for providing a shrinkable plastic film for labelling applications.

BACKGROUND OF THE INVENTION

It is general practice to apply a label to a surface of an item to provide decoration, and/or to display information about the product being sold, such as the content of the item, a trade name or logo. In addition to pressure-sensitive, wet glue and wrap around labels, other labelling technologies are available, for example shrink sleeves. Shrink sleeves may be provided by forming a tube of plastic film, which may be dropped over an item to be labelled and subsequently fed the item through a shrink-tunnel at elevated temperature causing the film to shrink and fit the shape of the item.

SUMMARY OF THE INVENTION

An object of the invention is to provide monoaxially stretched multilayer film structures and compositions having improved properties for the labeling and recyclability. An object of the invention is to provide a method for manufacturing monoaxially stretched multilayer film structures and compositions having improved properties for the labeling and recyclability.

Due to increasing environmental awareness, plastic materials and items such as plastic containers and consumer bottles are recycled in increasing amounts. To facilitate the recyclability of these items, materials used for labeling such items should be compatible with the general recycling methods. One of the major recycling methods is based on separation of the labels from the container to improve the purity of the recyclable plastic container material. In particular, the used containers comprising labels may be shredded and washed to remove the labels, which may comprise printing inks and various other impurities, such as adhesives. Novel labeling methods, such as heat-shrinked labels, shrink sleeves and roll-fed shrink sleeves, provide ways to reduce the use of adhesives and improve the segregation of the labels from the containers. Therefore, it is desirable to obtain films used for labeling, which may comprise a relatively low thermally induced shrinkage in temperatures during transportation, where the temperature may rise up to 60° C., but a high thermally induced shrinkage in higher temperatures used in manufacturing of labels, such as labels used as roll-fed shrink labels (RFS). Furthermore, the films should be suitable for disposable labels, printable to convey product information and easily separable from the labeled articles, such as plastic containers or bottles.

Copolymers of alpha-olefin and alkyl acrylate have in general been used as in the tie layer of a polymer film, in concentrations ranging between 1 to 2% by weight. However, it has now been surprisingly been found out that at least certain acrylate copolymers may in addition be suitable for core layer polymers of thermally inducible multilayer films. The core layer of a multilayer film may thus comprise a copolymer of alpha-olefin and alkyl acrylate. The various embodiments of the invention relate to obtaining monoaxially stretched multilayer film structures and compositions having improved properties for the labeling and recyclability.

According to an aspect of the invention, there is provided a multilayer film for labeling comprising a first skin layer, a second skin layer and a core layer between the first skin layer and the second skin layer, wherein at least one of the first skin layer and the second skin layer comprises cyclic olefin copolymer and the core layer comprises copolymer of ethylene and butyl acrylate or propylene terpolymer.

According to another aspect of the invention, there is provided a method for obtaining a multilayer film for thermally inducible shrink labels, the method comprising:
providing a first skin layer and a second skin layer, wherein at least one of the first skin layer and the second skin layer comprises cyclic olefin copolymer,
providing a core layer between the first and the second skin layer, wherein the core layer comprises propylene terpolymer or copolymer of ethylene and butyl acrylate,
stretching the multilayer film in the range of 4 to 7 times in a first direction for obtaining monoaxially stretched multilayer film having a tension in the first direction, and
cooling the multilayer film to room temperature A product according to an embodiment of the invention may be used for example as a label on a container surface, wherein the container may be, for example, a recyclable plastic bottle, such as a PET bottle. In particular, the film may be used for a shrink sleeve, wherein the film is first processed into a label having defined dimensions and orientation, which label may then be attached against a container surface by thermally induced shrinking, preferably on a temperature in the range of 65° C. to 85° C., more preferably in the range of 70° C. to 85° C., most preferably in the range of 70° C. to 80° C. By selecting the composition and the structure of the film, a desirable shrinkage, such as at least 15% or at least 25%, preferably at least 35% may be obtained. The composition and the structure of the film may also be selected to control the stiffness of the film, which may be needed for the label manufacturing and disposing processes. Furthermore, the composition has an effect to the printability, which may be needed on at least one skin surface. In particular, the density of the film material may be less than the density of the container material and water used for washing, such that the label material may float and can thus be separated from sinking container material by skimming the surface.

Further embodiments of the invention are presented in the detailed description of the invention and in the dependent claims.

DESCRIPTION OF THE DRAWINGS

In the following some examples and embodiments of the invention will be described in more detail with reference to appended drawings, in which.

DETAILED DESCRIPTION OF THE INVENTION

Figure 1:
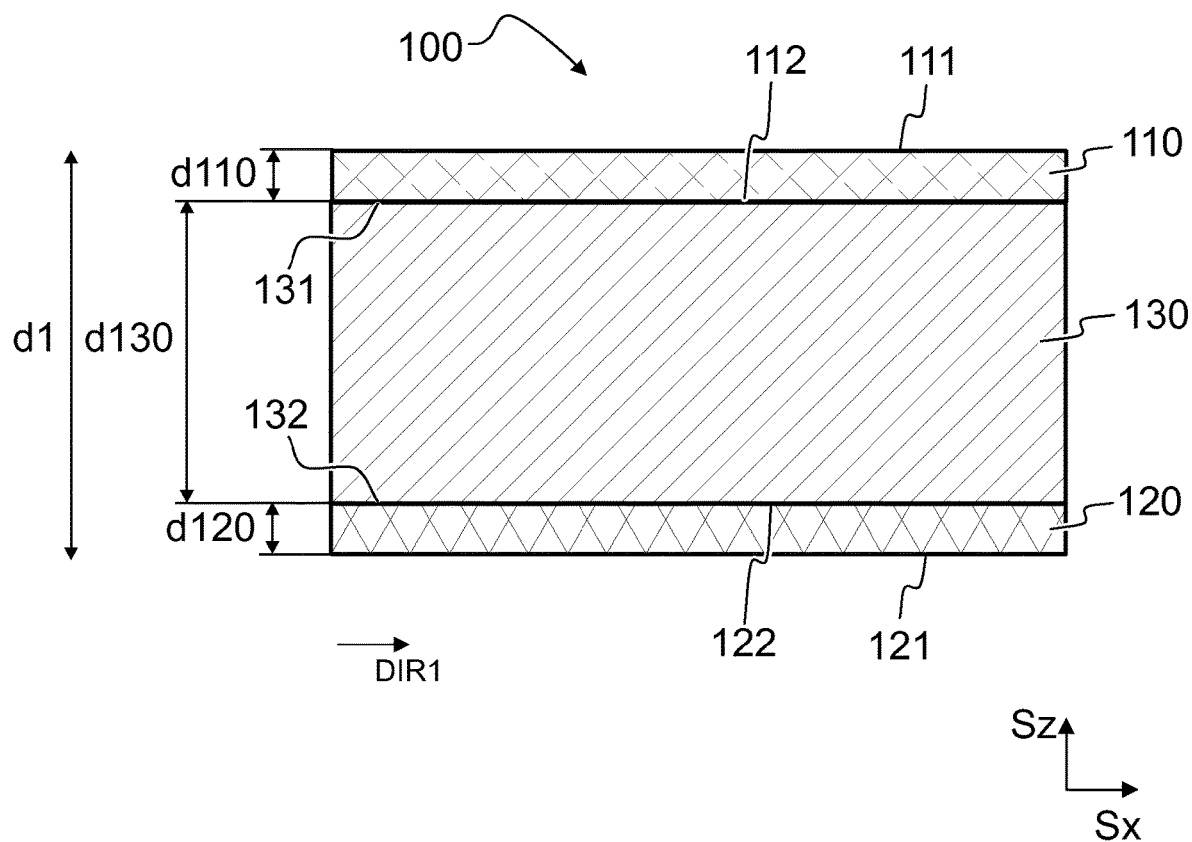
FIG. 1 shows, in a cross sectional view, an example embodiment of a multilayer plastic film face stock structure for a label.

In this description and claims, the percentage values relating to an amount of raw materials are percentages by weight (wt. %) unless otherwise indicated.

The films of the invention are suitable for labels and use for labelling of items. Especially the multilayer plastic films may be used for a face film of a label. In other words, the films described above are suitable for a label film. The films are suitable for labelling of a wide range of product designs and particularly suitable for highly contoured containers and products comprising curved sections, recesses and/or protrusions at the outer surface. The labels comprising heat shrink multilayer face film are suitable for items of glass, plastic, ceramics, glass, and metal. Shrinkage properties of films and/or labels enable labels to be used in highly contoured containers. The item may comprise or consists of polyethylene terephthalate (PET). The item may have a shape of a bottle. The films of the invention may also be used for labelling of batteries. The films may also be used as a face stock of a label laminate further comprising an adhesive layer and a release liner. For example, film according to the some or/all embodiments may be used for a face stock of a wash-off labels. Wash-off labels may be used e.g. for labelling of glass bottles. Due to the shrinking capability of the film, the labels may be efficiently detached and removed (washed-off) from the surface labelled during subsequent washing process.

As used herein, the phrase "label" refers to a piece of material, which is used for labelling of an item. Label may be used to identify something. Label may be attached to an article. In other words, label is suitable to be applied to a surface of an item to provide decoration, and/or to display information about the product being sold, such as content information, a trade name, a logo, a barcode, or any other graphics. The item may also be called as an article, or a substrate. Preferably, the label comprises a face film and at least some graphics on a surface of the face film. A face film may also be referred to as a label film. The graphics may comprise, for example, printed information and/or decoration. The graphics may comprise, for example one or more colours. A label may be a product having length, width and thickness, the product being a film or derived from a film, for example by cutting. A label comprises a first surface portion intended to be attached to a second surface portion different from the first surface portion. The second surface portion may be a separate surface portion of the label, or a surface portion of another product. The first and second surface portions may be adjoined to each other by various means, such as by using an adhesive, a solvent or heat. For example, the first and the second surface portions may be adjoined to each other by adhesive, when the label is attached on the surface of an item to be labelled, such as a container. Alternatively, or in addition, a first surface portion of the label may be seamed to another surface portion of the same label, when the label is produced as a sleeve to be fitted around the outer surface of a container to be labelled.

As used herein, the phrase "shrinkable" refers to a property of a plastic film or a label made thereof to shrink under exposure to external energy. A thermally shrinkable plastic film or a heat shrinkable plastic film, such as a face film of a label, may shrink when exposed to an elevated temperature. The exposure to an elevated temperature may induce a shrinkage. Heat may be applied by various means, such as by long wavelength radiation, steam, hot air or by any combination of these. Long wavelength radiation may be, for example, infra-red range radiation. In response to application of heat, the thermally inducible shrinkable plastic film or a label comprising said plastic film is arranged to shrink.

As used herein, the phrase "machine direction" MD refers to the running direction $S_x$ of the plastic film or continuous label web during label manufacturing. "Transverse direction" TD or "cross direction" CD refers to the direction $S_y$ perpendicular to the running direction $S_x$ of the film or label web.

A ratio of total film thickness before and after stretching is called a "draw ratio" or "drawing ratio" (DR). It may also be referred to as a stretching ratio or orientation ratio. In other words, draw ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometres before uniaxial orientation is stretched by a draw ratio of 5. After the uniaxial orientation the film may have a fivefold diminished thickness of 20 micrometres.

The plastic film may be drawn (stretched) at least in one direction. The film may be drawn in a machine direction, in a transverse direction, or both. The resulting film is thus monoaxially (uniaxially) oriented (MO) or biaxially oriented (BO). Monoaxially oriented film may be machine oriented (MDO) or transverse oriented (TDO) in accordance to the direction of the orientation (stretching). The stretching of the film and orientation of the polymer chains may be observed microscopically. Further, the orientation is detectable e.g. from the mechanical properties of the films, such as values of modulus and/or tensile strength.

As used herein, the phrase "roll-fed shrink film" (RFS) refers to labelling process, where a ready cut label is rolled over a container and then the label is shrunk in order to conform shape and size of the container. Label is supplied from a reel, cut into individual labels and applied around an item. Adhesive (e.g. hot melt adhesive) is used to hold the label on the surface of the item. The adhesive may be applied on the label or on the container in an area between the leading edge and the surface of the container. The adhesive may also be applied between trailing and leading edges of the label. When rolled over to an item, the trailing and leading edges may overlap and form a seam. Subsequent shrinking process at high temperatures enables tight fitting of the label around the item. Heat shrinking may occur at a shrink tunnel, where for example hot air, steam, infra-red radiation or a combination of any of these may be blown towards passing items. The described process may be called as on-line labelling process. Roll-fed shrink films may be monoaxially oriented in machine direction (MD). Alternatively, films may be monoaxially oriented in transverse direction. When a label consists of a MDO shrink film as a face stock, and the machine direction of the label extends circumferentially around the item, the label is arranged to shrink primarily in the orientation direction when heated. In addition to the above described "roll-fed shrink film" (RFS), variations of the labelling process exist. For example, in some labeling applications the label may be hold on top of the bottle without an adhesive, such as a hot melt adhesive. In such applications, a sleeve label may be wound and cut on a cylindrical mandrel having vacuum inside to hold the sleeve on correct position. As in the roll-fed shrink film application, there may be a small overlap of sleeve label ends, which may be seamed, for example, with laser welding or ultrasonic radiation, to create a label sleeve. Then sleeve may be positioned on top of a container and subsequently shrunk on top of the container in a steam tunnel.

As used herein, the phrase "shrink-sleeve" or "heat shrinkable sleeve film" (HS) refers to a labelling process, where a preformed label tube (or sleeve) is introduced around an item. Shrink sleeve label comprises or consists of transverse direction oriented (TDO) shrink film. The film is seamed into a continuous tube label around the axis extending to the machine direction ($S_x$). The formed continuous tube (or sleeve) is cut into predetermined lengths and supplied as a form of individual tube label around an item. The item or container may be warmed before a cylindrical tube label is introduced over it. Tube around an item is heated in order to shrink the tube label around the item. The transverse direction orientation of the tube label extends circumferentially around the item. Thus, the label may primarily shrink in the transverse direction.

Multilayer Structure

FIG. 1 presents a cross sectional view of a multilayer film 100 according to an example of the invention. A multilayer film 100 refers to a film structure comprising a plurality of layer, such as two or more layers. Preferably, a multilayer film 100 suitable for shrink labels comprises a symmetrical structure, wherein a core layer 130 having a first surface 131 and a second surface 132 is directly adhered from both surfaces 131, 132 to other layers of the film. The core layer 130 may be adjacent to a first skin layer 110 and a second skin layer 120, wherein the phrase "skin layer" refers to any layer of the multilayer film 130 having only one of its principal surfaces directly adhered to another layer of the multilayer film 100. The inner surfaces 112, 122 of the first skin layer 110 and the second skin layer 120 are adhered against another layer of the multilayer film 100, such as the core layer 130. The other principal surfaces of each of the two skin layers form the outer surfaces 111, 121 of the first skin layer 110 and the second skin layer 120, and the outer surfaces of the multilayer film 100. The outer surface of the multilayer film 100 may be used for printing, such as graphics or text, to carry information on a label.

In addition to the core layer 130 and the skin layers 110, 120, the multilayer film 100 may comprise additional layers between the two skin layers 110, 120. When the multilayer film 100 is intended to be thermally shrinkable, the multilayer film 100 may comprise a symmetrical structure, in other words, there is an equal number of layers on both sides of the core layer 130. In particular, symmetrical structures wherein the thickness d110, d120 of the skin layers 110, 120 comprise equal thickness, may have less tendency for curling. The curling tendency may be apparent even before there is any shrinking, in some asymmetric films in particular. For example, in some asymmetric films curling may be due to the different compositions and layer thicknesses. The curling refers to one surface of the multilayer film 100 deforming more than the other surface. Symmetrical multilayer film 100 structures may in particular be used to improve the thermally inducible shrinkage of labels, wherein the skin layers 110, 120 may comprise similar compositions.

The multilayer film 100 may comprise a thickness d1, comprising the thickness d130 of the core layer and the thickness d110 of the first skin layer and the thickness d120 of the second skin layer. In general, the core layer may have the largest thickness d130, such as 60%, 70%, 80%, 90% or 95% of the thickness d1 of the multilayer film 100. Furthermore the thickness profile of the multilayer film may be symmetrical, such that the the thickness d110 of the first skin layer may be equal to the thickness d120 of the second skin layer. The thickness d110, d120 of a skin layer 110, 120 may be, for example 2.5%, 5%, 10%, 15% or 20% of the thickness d1 of the multilayer film 100. The core layer 130 may form major portion of the multilayer film 100 structure. The core layer 130 may have a monolayer or multilayer structure. The core layer 130 may be thicker than the first skin layer 110 and the second skin layer 120. For example, the core layer 130 may form 60% of the total thickness d1 of the multilayer structure. Alternatively, the core layer 130 may have thickness d130 of 40% of the total thickness d1 of the multilayer film 100. In a symmetric multilayer film 100 comprising three layers, the core layer 130 having thickness d130 of 40% of the total thickness d1 of the multilayer film 100 still forms major portion of the multilayer film 100, since the skin layers 110, 120 may have thickness d110, d120 of up to 30% of the multilayer film 100 thickness d1. In other words, the thickness of the first skin layer or the second skin layer may be equal to or less than 30% of the total thickness of the multilayer film 100. Thickness d130 of the core layer 130 may be from 15 to 50 microns, or from 20 to 50 microns, preferably around 30 or 25 microns. Thickness of skin layers d110, d120 may be 40% of the total thickness d1 of the multilayer structure. Alternatively, the combined thickness of skin layers 110 and d120 may be 60% of the total thickness d1. The thickness d110, d120 of a skin layer 110,120 may be less than 20 microns, preferably around 10 or 7.5 microns or less. The overall thickness d1 of the multilayer film 100 may be from 20 to 70 microns or from 25 to 60 microns, preferably around 50 microns or around 40 microns or less. Preferably the multilayer film 100 has uniform overall thickness. Uniform thickness refers to a homogeneous thickness of a multilayer film 100, wherein a thickness variation along the multilayer film 100 is small. For example in a multilayer film 100 area of 100 mm times 100 mm variation of the film thickness is less than 10%, preferably between 0.1 and 5.0%. Uniform thickness of the multilayer film 100 provides better quality labels, for example, labels having good visual appearance. Uniform multilayer film 100 thickness may have effect on the register control and image quality of the printing.

Stretching

Unoriented multilayer film 100 may be manufactured by using either a cast or blown-film extrusion process. A shrinkable multilayer film 100 may be obtained by stretching (drawing) the extruded multilayer film 100 to an extent several times its original dimension to orient the multilayer film 100. The stretching may be performed by using heated draw rolls with gradually increasing speed. The stretching may be performed below the melting temperature of the polymer. Furthermore, the stretching may be performed at or near the glass transition temperature of the polymer. Preferably the multilayer film 100 stretching temperature is between 50 and 120° C., preferably between 60 and 110° C. or between 60 and 100° C. The stretching of the multilayer film 100 is performed at the lowest possible temperature, which in general is a temperature slightly, in the range of 5 to 15° C. above the glass transition temperature of the multilayer film 100. As a rule of thumb, the stretching is done on a film which remains transparent or clear during the stretching procedure.

The stretching may be performed in one direction of the film, e.g. in machine direction, i.e. in longitudinal direction of the multilayer film 100. Multilayer film 100 stretched in machine direction may be referred to as machine direction oriented (MDO) multilayer film 100. In MDO multilayer film 100 the polymer chains are oriented monoaxially in said machine direction. Machine direction oriented multilayer film 100 may be used for roll-fed labelling, i.e. in a labelling process where the multilayer film 100 is supplied from a reel, cut into separate labels, after which labels are mounted around an item and seamed during labelling step using adhesive, such as UV-acrylic hot-melt adhesive. Alternatively seam may be formed by solvent seaming, hot-bar (heat-sealing), laser-welding or ultrasonic radiation. During mounting the label around an item some adhesive may be used between the label and the surface of the item in order to keep the label in specified place. The label around the item may be shrunk in order to form a tight attachment and/or to conform to the shape of the item.

Alternatively, the multilayer film 100 may be stretched in transverse direction (TD), which means the direction perpendicular to machine direction of the film. Transverse direction (TD) may be referred also to as cross direction (CD). Transverse oriented films may be used for shrink-sleeve type of labels, which films are seamed into a form of a tube prior to labelling, in general by using a solvent. The tube is cut into tubes of predetermined lengths and supplied as in a form of tube around an item. The labelled item may be heated in order to provide shrinking of the film around the item and/or to provide tight fitting of the label around the item and/or to conform the shape of the item with the label.

The stretched (oriented) structure of the multilayer film 100 and orientation of the polymer chains may be observed microscopically. Further, the orientation is detectable e.g. from the mechanical properties of the films, such as values of modulus and/or tensile strength.

The multilayer film 100 may be monoaxially stretched approximately from 2 to 10 times, preferably 3 to 9 times, and most preferably from 3 to 8 times in a first direction. The multilayer film 100 may be monoaxially stretched in machine direction. Draw ratio (or orientation ratio) of the MD film is from 2 to 10 (from 2:1 to 10:1), preferably from 3 to 9 (from 3:1 to 9:1), most preferably from 3 to 8 (from 3:1 to 8:1), correspondingly. Alternatively, the multilayer film 100 may be monoaxially stretched in transverse direction, for example, from 2 to 10 times, preferably 3 to 9 times, and most preferably from 3 to 8 times.

For example, the multilayer film 100 may be oriented at least 3 times at least in one direction, i.e. the draw ratio (stretching ratio) of the film is at least 3 in one direction of the film. Alternatively, the orientation ratio at least in one direction may be at least 4. For example, the draw ratio may be in the range of 3 to 7, preferably in the range of 4 to 6. A stretching of at least 3 times may be beneficial to provide sufficient shrinkage potential for the film. A higher stretching facilitates the formation of sufficient shrink tension to hold the label in place against an object. However, a high stretching also increases the risk of the multilayer film 100 breaking or snapping during stretching. The breaking of the multilayer film 100 is related to the stretching conditions. In particular, the layer compositions may be selected to adjust the stretching and shrinking behaviour of a multilayer film 100. In compositions according at least some embodiments, a stretching equal to or less than 7 times, such as equal to or less than 6 times is preferable.

After stretching, the multilayer film 100 may be cooled with one or more cooling rolls having temperature of less than in the multilayer film 100 stretching. Shrinkage potential may be provided for the multilayer film 100, by rapidly cooling the multilayer film 100 after the stretching. The temperature profile in cooling may be decreasing. In other words, one or more cooling rolls may have a decreasing temperature profile starting at or slightly below stretching temperature, each subsequent roll having a temperature equal to or less than the previous cooling roll. By subsequent cooling after stretching, the multilayer film 100 is not heat set, i.e. not annealed, which increases the shrinkage potential for the multilayer film 100. The cooling may be arranged by passing the multilayer film 100 through cooling rolls. Cooling of the film may be gradual, for example first cooling roll(s) may have a temperature of around 90° C., for example in the range of 80 and 90° C. Subsequent cooling roll(s) may have temperature equal to or less than the previous cooling roll, such as in the range of 90° C. to 25° C., or in the range of 50° C. and 25° C. The cooling rolls at the end of the cooling step may comprise a temperature in the range of 10° C. and 20° C., or around 25° C. such that the multilayer film 100 temperature may be diminished to a general room temperature in the range of 22° C. to 25° C. Stretching and subsequent cooling may provide suitable shrink potential for the multilayer film 100. Due to the shrink potential, the oriented multilayer film 100 comprise an ability to shrink under elevated temperatures above an initial shrinkage temperature towards the original unstretched dimensions. In other words, subsequent application of sufficient heat causes the multilayer film 100 comprising thermally inducible shrinkage potential to relax and the multilayer film 100 may return at least to some extent from the oriented state towards the non-oriented (initial) state. Thus, machine direction oriented films primarily shrink in the machine direction and transverse oriented films in the transverse direction.

The multilayer film 100 may be stretched, for example monoaxially in a linear direction DIR1 to orientate the multilayer film 100 in machine direction or transverse direction. The term "machine direction" MD refers to the running direction Sx of the multilayer film 100 during manufacturing and "transverse direction" TD or "cross direction" CD refers to the direction Sy perpendicular to the running direction direction Sx of the multilayer film 100. During stretching the randomly oriented polymer chains of the cast or extruded multilayer film 100 are oriented in the direction of stretching, also denoted as drawing. The degree of orientation of the polymer chains depends on the stretching ratio of the multilayer film 100. In other words, the polymer chains in the multilayer film 100 stretched with a higher draw ratio are more oriented when compared to a multilayer film 100 stretched with lower draw ratio. In general, a multilayer film 100 may be stretched by a given ratio to obtain desired mechanical, thermodynamic and optical properties for the multilayer film 100. Furthermore, after stretching, the oriented multilayer film 100 may be slitted, referring to trimming the transversal ends of the film, to obtain a multilayer film 100 comprising a desired thickness d1. The desired thickness for a multilayer film 100 prior to stretching may be, for example, in the range of 150 to 250 micrometers (μm), such as 160, 180, 200, 220 or 240 micrometers (μm). According to an embodiment of the invention, the multilayer film 100 may be stretched in the range of 4 to 7 times, preferably in the range of 4 to 6 times, in a first direction DIR1. The first direction DIR1 may be parallel to the multilayer film machine direction. Alternatively, the first direction DIR1 may be perpendicular to the multilayer film machine direction. When the multilayer film 100 is used for labels oriented in machine direction, the labels may be printed, fed and cut directly from a roll, such as roll-fed shrink labels. When the multilayer film 100 is used for labels oriented in transverse direction, a separate step may be required to first cut the film to a tubular shape, seam the tube and then, prior to labelling, cut the individual tubes and apply these over the container to be labeled. In other words a sleeve with a certain height suitable to container/bottle may be cut just before sleeve is dropped around a container to be labelled.

The stretching reduced the thickness d1 of the film by the stretching ratio. The stretching ratio is the total film thickness d1 before and after stretching, also denoted as "draw ratio" or "drawing ratio" (DR). In other words, stretching ratio is a ratio of non-oriented (undrawn) film thickness to the oriented (drawn) film thickness. The non-oriented film thickness is the thickness after casting or extrusion and subsequent chilling of the film. When stretching the multilayer film 100, the thickness of the multilayer film 100 may diminish in the same ratio as the multilayer film 100 length stretches or elongates. For example, a multilayer film 100 having a thickness of 100 micrometres before machine direction orientation (MDO) is stretched by a draw ratio of 5. After the machine direction orientation the facestock has a fivefold diminished thickness of 20 micrometres. A thickness d1 for a multilayer film 100 after stretching may be, for example, in the range of 20 to 60 micrometers (μm) after monoaxially stretched and slitted. The range may preferably be in the range of 25 to 50 micrometers (μm), such as 25, 30, 35, 40, 45 or 50 micrometers (μm). The thickness interval in the range of 20 to 60 micrometers (μm) may be selected on a micrometer basis such that, for example in the range of 40 to 45 micrometers (μm), the thickness d1 for a multilayer film 100 after stretching may be 40, 41, 42, 43, 44 or 45 micrometers. The thickness d1 may be measured from multiple, such as at least 3 or 4 or 5, separate locations as an average thickness d1 of the multilayer film 100 after slitting the multilayer film 100 ends from the stretched film. The thickness d1, as well as the thickness d110, d120 and d130 of the core layer 130, the first skin layer 110 and the second skin layer 120 of the multilayer film 100 may be selected based on the chemical composition of the layers. In particular, a layer composition providing increased stiffness for the multilayer film 100, and in particular to the skin layers 110, 120, may be used to reduce the thickness d1 of the multilayer film 100.

Thermal Shrinkage

Of particular interest are the thermodynamic properties of a monoaxially stretched film. The stretching ratio providing the multilayer film thickness d1 may be selected to adjust the shrinkage behavior of the multilayer film 100 in different dimensions Sx, Sy, Sz. In general, stretching has an effect on characteristics such as tensile strength, stiffness, tear resistance, and impact strength of the multilayer film 100. When stretching a multilayer film 100 and cooling the film without annealing, for example by using a series of chilling rolls, each subsequent roll having a temperature equal to or less than the previous one, internal stresses are locked into the film. These internal stresses cause shrink tension, which may be released by heating the film.

Shrinkage may be measured according to the following method: providing a sample with measured and marked 100 mm times 100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method. In many labelling applications a steam tunnel may be preferred, to provide an easy method for uniform transfer of heat. However, it is evident, and has been noticed, that the same shrinkage properties apply regardless of the method, provided that the same temperatures are used. The composition of heat transfer medium (air, steam, water) is not critical for shrinkage behaviour.

The shrinkage potential and shrinkage behavior are further related to the multilayer film layer compositions, structures and processing techniques employed to manufacture the multilayer film 100. For example, different polymer compositions in a multilayer film layers may be used to obtain a specific shrinkage curve in the principal direction of shrinking. The principal shrinkage is due to the relaxation of the polymer chains in direction parallel to the stretching.

The thermally induced shrinkage may be focused on a local area or to the whole plastic film area. When providing a heat shrink film or heat shrink label, the multilayer film may comprise stiffness. In general, a multilayer film, or a label obtained from a multilayer film, or a heat shrink label obtained from a multilayer film may be attached directly on a container surface by an adhesive prior to labelling. The adhesive may be applied as a hot melt adhesive, for example by rolls or by spraying one, two or more droplets of adhesive material on the surface of the container to be labelled or on the item used for labelling. The label may then be wrapped or tightened against the container, and consequently seamed in place. The seaming may comprise the use of a solvent, or an adhesive, such as a ultra-violet (UV) radiation curable hot melt adhesive.

In the following description of shrinkage the following denotations are used:

h1 a first length of a label film prior to shrinking,
w1 a second length of a label film prior to shrinking,
d1 thickness of a label film prior to shrinking,
$L_0$ a length of a film, in a first direction, before heat treatment, wherein the first direction is in the plane of the film,
$L(T)$ the length of the part of the film having the length $L_0$ in the first direction before heat treatment, after a heat treatment, in which the temperature of the thermally shrinkable plastic film has been T, and cooled back to the temperature before the heat treatment. Thus, the length $L(T)$ refers to a length of the shrunk film,
ε strain (when positive) or shrinkage (when negative),
$\varepsilon(T)$ shrinkage of a film, after a heat treatment wherein the temperature of the thermally shrinkable plastic film has been T, defined as $\varepsilon(T)=[L(T)-L]/L$. For thermally shrunk materials $\varepsilon(T)<0$; in addition $\varepsilon(T)>-1$,
$\varepsilon(98° C.)$ shrinkage of a film, after a heat treatment wherein the temperature of the thermally shrinkable plastic film has been 98° C.,
$\varepsilon_r(T)$ relative shrinkage of a film, defined as $\varepsilon(T)/\varepsilon(98° C.)$,
pp percentage point, i.e. the absolute difference of relative values given in per cents.

The shrinkage $\varepsilon(T)$ for the temperature T is defined as the relative change in length in the first direction; i.e. $\varepsilon(T)=(L(T)-L_0)/L_0$. It is noted that by this definition, the numerical value of shrinkage is negative, while the numerical value of strain would be positive. Thus a "better" shrinkage is, in terms of numbers, a more negative (i.e. a smaller) value. As is implicitly clear, in practical applications a thermally shrinkable film can be shrunk using different heat sources such as hot air, hot gas, steam, and/or radiation. Thus, in practice, drying is not necessarily needed.

Figure 2:
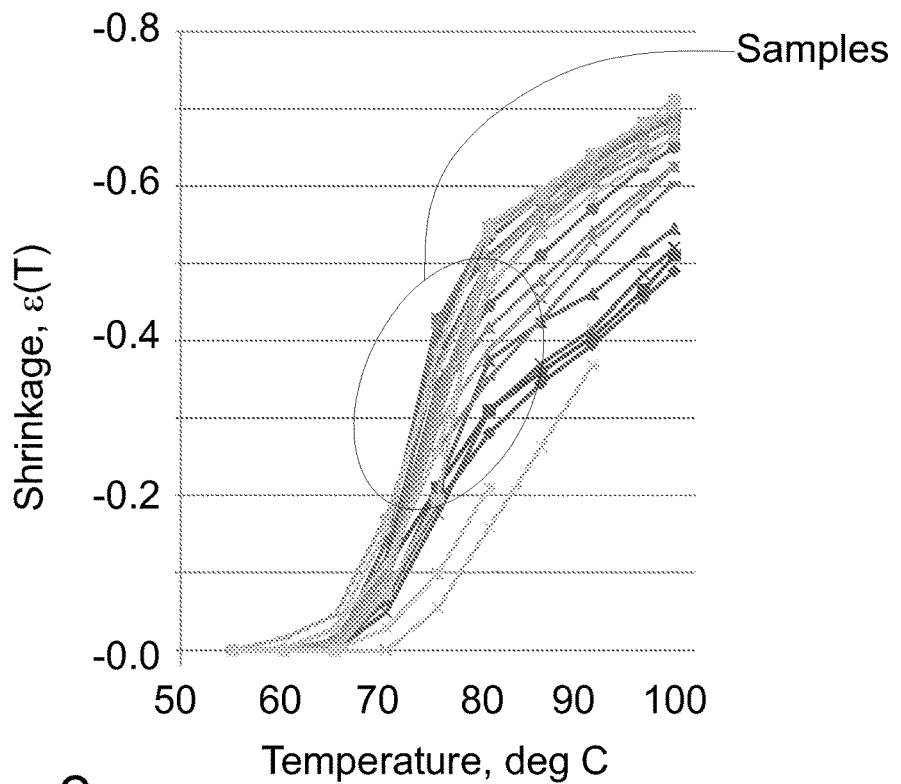
FIG. 2 shows examples for shrinkage for embodiments of heat shrinkable label films according to the present invention.

In FIG. 2, the shrinkage curves of different samples according to embodiments of the invention are shown; with the reference "Samples". In total 21 samples were manufactured and measured.

Figure 3:
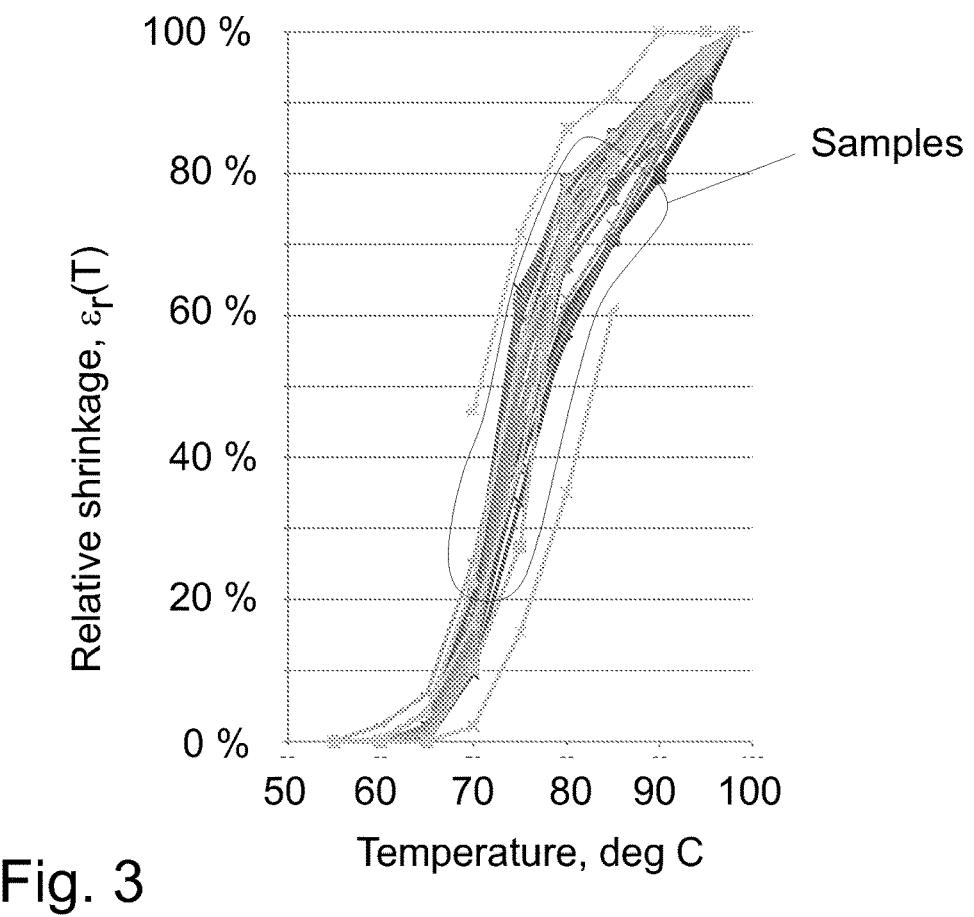
FIG. 3 shows examples for relative shrinkage for embodiments of heat shrinkable label films according to the present invention.

The values of relative shrinkage of different samples according to embodiments of the invention are shown in FIG. 3 with the reference "Samples". In total 21 samples were manufactured and measured.

Referring to FIGS. 2 and 3, the film should use most of its shrinkage potential for a reasonable small temperature change. To more precisely define the shrinkage potential, a relative temperature dependent shrinkage $\varepsilon_r(T)$ is herein defined as $\varepsilon_r(T)=\varepsilon_r(T)/\varepsilon(98°\text{ C.})=\{[L(T)-L_0]/L_0\}/\varepsilon(98°\text{ C.})$. In this description, the value of $\varepsilon_r(T)$ will be given in percentages. The reason for selecting the reference temperature of 98° C. is that such a temperature is achievable using hot water or unpressurized (pressure equals 1 atm) steam. It is noted that the film may shrink also for temperatures above 98° C., however these are of little practical interest, since the films are commonly heated by water and/or steam. So, the value $\varepsilon(98°\text{ C.})$ is not a maximum shrinkage, only a reference value.

When the film uses most of its shrinkage potential for a reasonable small temperature change, the difference $\varepsilon_r(T_2)-\varepsilon_r(T_1)$, between the values of the relative temperature dependent shrinkage $\varepsilon_r(T)$ for at least one pair of two temperatures $T_2$ and $T_1$, the temperatures having a difference $T_2-T_1=15°$ C., is more than 50 percentage points (pp); wherein the lower of the two temperatures, $T_1$, is from 65° C. to 70° C. For example, the lower of the two temperatures, $T_1$, may be 65° C., whereby $\varepsilon_r(80°\text{ C.})-\varepsilon_r(65°\text{ C.})$ is more than 50 pp. For example, the lower of the two temperatures, $T_1$, may be 70° C., whereby $\varepsilon_r(85°\text{ C.})-\varepsilon_r(70°\text{ C.})$ is more than 50 pp. Preferably, the difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, is more than 65 pp; preferably more than 70 pp.

In addition or alternatively to the shrinkage $\varepsilon(T)$, the shrinkage behavior can be described using the relative shrinkage $\varepsilon_r(T)$ as defined above. In addition or alternatively to the shrinkage $\varepsilon(T)$, as discussed above, the relative shrinkage $\varepsilon_r(T)$ is preferably between limiting values in some specific temperatures.

First, for low temperatures, the relative shrinkage should be reasonably low. This is because the temperature during transportation may rise such that some shrinkage occurs. Thus, even if the film, when applied on a body, has already shrunk to some extent, the shrinkage potential of the film is still high, since the relative shrinkage is low.

Second, for high temperatures, the relative shrinkage should be reasonably high. This is because films that are purposely heat treated have preferably used most of their shrinkage potential. For example, when the crushed film floats on water, e.g. hot water, the crushed pieces are preferably not further shrunk on the water. For example, the crushed pieces may be collected using a sieve having a size, and further shrinking of the pieces might make the smaller than the sieve size. Thus their collection might become hard. Furthermore, the further shrinking, as discussed, might curve or bend the crushed pieces, and the further utilization of such curved pieces might be more problematic than the utilization of planar pieces. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

According to an embodiment, a heat shrinkable (thermally shrinkable) label film having a first length $L_0$ in a first direction before heat treatment and a second length $L(T)$ in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein
the shrinkage of the thermally shrinkable label film, after a thermal treatment such that the temperature of the thermally shrinkable label film has been T=98° C., is $\varepsilon(98°\text{ C.})$, wherein
the value of $\varepsilon(98°\text{ C.})$ is less than −0.45, optionally at most −0.85;
the shrinkage of the thermally shrinkable label film, after a thermal treatment such that the temperature of the thermally shrinkable label film has been T=65° C., is $\varepsilon(65°\text{ C.})$, wherein
the value of $\varepsilon(65°\text{ C.})$ is greater than −0.10, preferably greater than −0.07; optionally at most 0;
and
the thermally shrinkable label film has a relative temperature dependent shrinkage $\varepsilon_r(T)=\{[L(T)-L_0]/L_0\}/\varepsilon(98°\text{ C.})$, wherein
the difference between the values of the relative temperature dependent shrinkage $\varepsilon_r(T)$ for at least one pair of temperatures $T_2$ and $T_1$ having a difference $T_2-T_1=15°$ C., i.e. $\varepsilon_r(T_2)-\varepsilon_r(T_1)$, is more than 50 percentage points; wherein the lower of the two temperatures of the pair, $T_1$, is from 65° C. to 70° C.

In the previously presented, the lower of the two temperatures $T_1$ may be 65° C. The difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, may be more than 65 percentage points, preferably more than 70 percentage points.

According to another embodiment, a heat shrinkable (thermally shrinkable) label film having a first length $L_0$ in a first direction before heat treatment and a second length in the first direction $L(T)$ after heat treatment wherein the temperature of the thermally shrinkable plastic film has been T, whereby the thermally shrinkable label film has a temperature dependent shrinkage $\varepsilon(T)=[L(T)-L_0]/L_0$, wherein
the value of the temperature dependent shrinkage $\varepsilon(T)$ for the temperature T=65° C. is greater than −0.10, and
the value of the temperature dependent shrinkage $\varepsilon(T)$ for the temperature T=80° C. is less than −0.25.

According to another embodiment, a heat shrinkable (thermally shrinkable) label film having a first length $L_0$ in a first direction before heat treatment and a second length $L(T)$ in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein
the shrinkage of the thermally shrinkable label film, after a thermal treatment wherein the temperature of the thermally shrinkable label film has been T=98° C., is $\varepsilon(98°\text{ C.})$, wherein
the value of $\varepsilon(98°\text{ C.})$ is less than −0.45, optionally at most −0.85; and
the thermally shrinkable label film has a relative temperature dependent shrinkage $\varepsilon_r(T)=\{[L(T)-L_0]/L_0\}/\varepsilon(98°\text{ C.})$, wherein
the value of the relative temperature dependent shrinkage $\varepsilon_r(T)$ for the temperature T=65° C. is less than 10% and the value of the temperature dependent shrinkage $\varepsilon_r(T)$ for the temperature T=80° C. is more than 45%.

A large shrinkage potential may be obtained, for example, by polymer compounds such as cyclic olefin copolymers, where the seaming may be performed using other methods, such as laser welding or heat-sealing of outer layers. Laser welding or heat-sealing of outer layers in general may be used to provide seam which withstands large shrinkage of the label without opening of the seam. However, this may not be practical to implement in every application. In general, a multilayer film comprising large shrinkage potential refers to a multilayer film preferred in labelling methods, where the shrink label is placed around the surface of the items to be labelled as a sleeve or a seamed tube, which may then be shrunk against the item to be labelled without an adhesive to hold the label in place.

In some embodiments, a multilayer film may be configured to shrink less in a given temperature range. In general, a multilayer film comprising less shrinkage potential refers to a multilayer film preferred in labelling methods, where the shrink label is roll-fed on the surface of the item to be labelled and seamed from at least one end of the label against the item to be labelled by an adhesive. This may be preferred, for example, to obtain a sufficiently large shrinkage for the label to attach tightly against a container surface, but at the same time to prevent the opening of the seam. In particular, a seam comprising an ultra-violet (UV) radiation curable hot melt adhesive may not stand very large tension forces due to shrinkage, and may consequently break when too large shrinkage occurs. Therefore, for at least some hot melt adhesive based seaming methods, it may be preferred that the multilayer film comprises less shrinkage potential. This may be obtained, for example, by using polymer compounds such as copolymers or terpolymers of propylene.

Therefore, according to an embodiment, a heat shrinkable (thermally shrinkable) label film having a first length $L_0$ in a first direction before heat treatment and a second length $L(T)$ in the first direction after heat treatment wherein the temperature of the thermally shrinkable label film has been T, whereby
- the thermally shrinkable label film has a temperature dependent shrinkage $\varepsilon(T)=[L(T)-L_0]/L_0$, wherein
- the shrinkage of the thermally shrinkable label film, after a thermal treatment such that the temperature of the thermally shrinkable label film has been T=98° C., is $\varepsilon(98° C.)$, wherein
- the value of $\varepsilon(98° C.)$ is less than −0.30, optionally at most −0.60;
- the shrinkage of the thermally shrinkable label film, after a thermal treatment such that the temperature of the thermally shrinkable label film has been T=65° C., is $\varepsilon(65° C.)$, wherein
- the value of $\varepsilon(65° C.)$ is greater than −0.10, preferably greater than −0.07; optionally at most 0;
and
- the thermally shrinkable label film has a relative temperature dependent shrinkage $\varepsilon_r(T)=\{[L(T)-L_0]/L_0\}/\varepsilon(98° C.)$, wherein
- the difference between the values of the relative temperature dependent shrinkage $\varepsilon_r(T)$ for at least one pair of temperatures $T_2$ and $T_1$ having a difference $T_2-T_1=15°$ C., i.e. $\varepsilon_r(T_2)-\varepsilon_r(T_1)$, is more than 50 percentage points; wherein the lower of the two temperatures of the pair, $T_1$, is from 65° C. to 70° C.

In the previously presented, the lower of the two temperatures $T_1$ may be 65° C. The difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, may be more than 65 percentage points, preferably more than 70 percentage points.

According to another embodiment, a heat shrinkable (thermally shrinkable) label film having a first length $L_0$ in a first direction before heat treatment and a second length in the first direction $L(T)$ after heat treatment wherein the temperature of the thermally shrinkable plastic film has been T, whereby
- the thermally shrinkable label film has a temperature dependent shrinkage $\varepsilon(T)=[L(T)-L_0]/L_0$, wherein
- the value of the temperature dependent shrinkage $\varepsilon(T)$ for the temperature T=65° C. is greater than −0.10, and
- the value of the temperature dependent shrinkage $\varepsilon(T)$ for the temperature T=80° C. is less than −0.15.

According to another embodiment, a heat shrinkable (thermally shrinkable) label film having a first length $L_0$ in a first direction before heat treatment and a second length $L(T)$ in the first direction after heat treatment wherein the temperature of the thermally shrinkable label film has been T, whereby
- the thermally shrinkable label film has a temperature dependent shrinkage $\varepsilon(T)=[L(T)-L_0]/L_0$, wherein
- the shrinkage of the thermally shrinkable label film, after a thermal treatment wherein the temperature of the thermally shrinkable label film has been T=98° C., is $\varepsilon(98° C.)$, wherein
- the value of $\varepsilon(98° C.)$ is less than −0.30, optionally at most −0.6; and
- the thermally shrinkable label film has a relative temperature dependent shrinkage $\varepsilon_r(T)=\{[L(T)-L_0]/L_0\}/\varepsilon(98° C.)$, wherein
- the value of the relative temperature dependent shrinkage $\varepsilon_r(T)$ for the temperature T=65° C. is less than 10% and
- the value of the temperature dependent shrinkage $\varepsilon_r(T)$ for the temperature T=80° C. is more than 45%.

In above, the $\varepsilon(T)$ referred to the shrinkage of a film, and $\varepsilon_r(T)$ to the relative shrinkage of a film, defined as $\varepsilon(T)/\varepsilon(98° C.)$. The shrinkage may as well be expressed as a percentage difference of the length of a non-shrinked multilayer film in relation to a shrinked multilayer film, as described hereafter.

Figure 4:
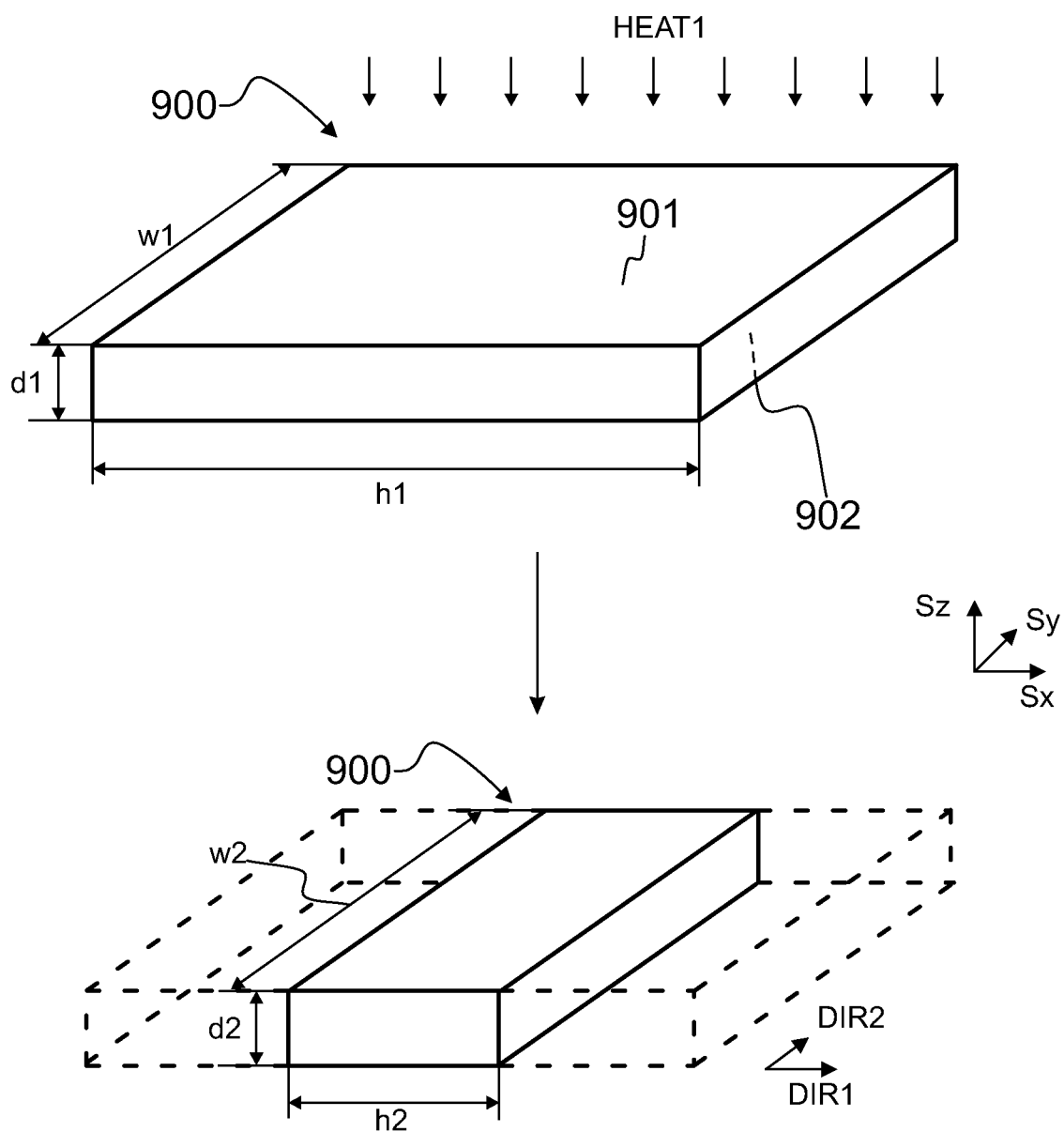
FIG. 4 illustrates an embodiment of the free shrinkage potential of a monoaxially stretched multilayer film.

Therefore, according to an embodiment, the shrinkage of a multilayer film at temperatures between 80 and 150° C., preferably between 80 and 110° C., more preferably between 80 and 90° C. may be expressed to be more than 20% in the orientation direction of the multilayer film. Preferably, shrinkage may be in the range of 20 to 40%, or in the range of 40 to 60%, or more than 60%, for example at least 70% in the direction of the orientation of the multilayer film. Referring to FIG. 4, the orientation direction may be parallel to $S_x$. The shrinkage may be in the range of 20 to 90%, preferably in the range of 25 to 80%, and most preferably in the range of 30 to 75% under conventional shrink film and label shrinking temperatures in the range of 80 to 150° C., preferably in the range of 80 to 130° C., more preferably in the range of 80 to 110° C., more preferably in the range of 80 to 90° C. in a steam-tunnel. In other than orientation direction, the multilayer film may have shrinkage less than 10%, preferably less than 7%, most preferably less than 5%, for example in the range of 0 to 5% or in the range of 2 to 4%. Referring to FIG. 4, the other than orientation direction may be direction parallel to $S_y$. The shrink performance of the multilayer film is adequate in order to conform the film to the profile of the substrate, which is to be labelled.

Furthermore, according to an embodiment, the shrinkage of the multilayer film in the direction of the orientation of the multilayer film may be in the range of 20 to 75% at a temperature range between 65 and 85° C. Preferably, the multilayer film and a label comprising the multilayer film is able to shrink in the range of 25 to 65% at a temperature range between 65 and 85° C. For example, the multilayer film and a label comprising the multilayer film is able to shrink in the range of 25 to 55%, or preferably in the range of 30 to 40% at a temperature range between 65 and 85° C. According to another example, the multilayer film and a label comprising the multilayer film is able to shrink in the range of 35 to 65%, or preferably in the range of 40 to 60% at a temperature range between 65 and 85° C. At temperature below 65° C. the multilayer film and the label comprising the multilayer film shrinkage may be less than 10%, preferably less than 5%, for example in the range of 0 to 10%, or in the range of 0.5 to 5%. The specific shrinkage profile of the multilayer film and the label comprising the multilayer film has an effect of on providing more controlled shrinkage behaviour for the film at a specific temperature. For example, specific shrinking curves of some/all embodiments may have an effect on more accurate shrinkage to be achieved even if some variation occurs during thermal treatment (shrinking process).

The composition of the multilayer film according to at least some embodiments has an effect on providing adequate shrinkage level for the label, preferably at least 65% shrinkage at 85° C., which is further advantageous during washing in subsequent recycling process. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

In some embodiments, as said above, a multilayer film may be configured to shrink less in a given temperature range. Depending of the type of a heat shrink film and heat shrink label seaming method, the heat shrinkable film or label may comprise a different potential for thermally inducible shrinkage. When expressed as a percentage difference of the length of a non-shrinked multilayer film in relation to a shrinked multilayer film, a multilayer film may comprise a composition enabling a large stretching in a monoaxial direction and a seam withstanding large tension forces, the thermally inducible shrinkage may be at least 15% preferably at least 25% or at least 35% shrinkage in the temperature range of 65 to 80° C. or as described above. In particular, large thermally inducible shrinkage may be obtained on multilayer films stretched in transversal direction and cut to shrink sleeves, which are seamed and cut to a tubular label prior to labelling. For a multilayer film stretched in a monoaxial direction and used as a roll-fed shrink label or where ultra violet radiation curable hot melt adhesives are used, the thermally inducible shrinkage may be on a different range. In particular, when ultra-violet (UV) radiation curable and/or hot melt adhesive is used for seaming the label to an item, such as when using multilayer film or label oriented in machine direction, the heat shrinkable film or label may comprise equal to or less than 60%, preferably equal to or less than 55%, most preferably equal to or less than 50% shrinkage in a temperature of 98° C. At a temperature of 98° C., the shrinkage may be equal to or more than 30%, preferably equal to or more than 35%, most preferably equal to or more than 40%. For example, at a temperature of 98° C., the shrinkage may be in the range of 30% to 60%, preferably in the range of 35% to 55%, most preferably in the range of 40% to 50%. At a temperature range between 65 and 85° C., the heat shrinkable film or label may comprise equal to or less than 55%, preferably less than 50%, most preferably, less than 45% shrinkage. At a temperature range between 65 and 85° C., the shrinkage may be equal to or more than 20%, preferably equal to or more than 25%, most preferably equal to or more than 30%. For example, at a temperature range between 65 and 85° C., the shrinkage may be in the range of 20% to 55%, preferably in the range of 25% to 50%, most preferably in the range of 30% to 45%. In other than orientation direction, the films may have shrinkage less than 10%, preferably less than 7%, most preferably less than 5%, for example between 0 and 5% or between 2 and 4%, expressed as a percentage difference of the length of a non-shrinked multilayer film in relation to a shrinked multilayer film. Referring to FIG. 4, the other than orientation direction may be direction parallel to $S_y$. The shrink performance of the multilayer films is adequate in order to conform the film to the profile of the substrate, which is to be labelled. Multilayer film(s) which are not able to shrink as presented above are not suitable for face films of labels and are thus not suitable for heat shrink labelling applications. A heat shrinkable label comprises or consists of a face film configured to shrink between 15 and 70%, at a temperature range between 65 and 85° C. In addition, the heat shrinkable label comprises or consists of a face film configured to shrink less than 10% at temperature below 65° C.

Therefore, a multilayer film may be configured to shrink in the direction of the orientation of the multilayer film at least 15%, preferably at least 25%, or preferably at least 35% at a temperature range between 65 and 85° C. Furthermore, the multilayer film may be configured to shrink less than 10% at a temperature below 65° C. The multilayer film maybe configured to shrink in the direction of the orientation of the multilayer film, for example, in the range of 20 to 75% or in the range of 25 to 65% at a temperature range between 65 and 85° C. Alternatively, when less shrinkage is preferred, the multilayer film may be configured to shrink in the direction of the orientation of the multilayer film equal to or less than 60%, preferably equal to or less than 55%, most preferably equal to or less than 50%, at a temperature of 98° C. For example the multilayer film may be configured to shrink in the direction of the orientation of the multilayer film equal to or more than 20%, preferably equal to or more than 35%, most preferably equal to or more than 40%, at a temperature of 98° C. The multilayer film may be configured to shrink in the direction of the orientation of the multilayer film, for example, in the range of 30 to 60%, preferably in the range of 35 to 55%, most preferably in the range of 40 to 50%, at a temperature of 98° C. The multilayer film may be configured to shrink in the direction of the orientation of the multilayer film equal to or less than 55%, preferably equal to or less than 50%, most preferably equal to or less than 45%, at a temperature range between 65 and 85° C. The multilayer film may be configured to shrink in the direction of the orientation of the multilayer film equal to or more than 20%, preferably equal to or more than 25%, most preferably equal to or more than 30%, at a temperature range between 65 and 85° C. The multilayer film may be configured to shrink in the direction of the orientation of the multilayer film, for example, in the range of 20 to 55%, preferably in the range of 25 to 50%, most preferably in the range of 30 to 45%, at a temperature range between 65 and 85° C. By shrinkage in the direction of the orientation of the multilayer film it is meant, that the multilayer film shrinks essentially towards the state prior to orientation, as shown for example in FIG. 5 by directions DIR1 and DIR1'.

The multilayer film according to at least some/all embodiments may comprise a shrink force in the orientation direction of the face film during heating at temperatures between 60 and 98° C. of less than 10N/15 mm, or less than 8N/15 mm, or in the range of 1 to 10N/15 mm, or in the range of 2 to 8 N/15 mm. Adequate shrink force is needed for the proper fitting of the label around an item when heat is applied.

FIG. 4 illustrates an embodiment of a label having a thermally inducible shrinkage potential. The label 900 may be obtained from a monoaxially stretched multilayer film 100, for example by cutting. The label 900 comprises a first surface 901 and a second surface 901, which may be surface treated to improve the printability of the label 900. The label 900 comprises a primary length h1, a primary width w1 and a primary thickness d1 dimensions in a first temperature $T_1$. The temperature $T_1$ refers to the lower of the pair of two temperatures $T_2$ and $T_1$, which may be used to define a relative temperature dependent shrinkage $\varepsilon_r(T)$. Each multilayer film 100 may comprise an initial shrinkage temperature $T_{shr}$, below which there exists only residual thermally inducible shrinkage, such as less than 10%. The initial shrinkage temperature $T_{shr}$ may be a temperature equal to or more than 60° C., preferably equal to or more than 65° C. For processability, the initial shrinkage temperature $T_{shr}$ in general may be equal to or less than 70° C. When providing heat HEAT1 to a multilayer film 100 comprising a thermally inducible shrinkage potential, the thermally inducible shrinkage may take place in a second temperature $T_2$ equal to or higher than the initial shrinkage temperature $T_{shr}$. The second temperature $T_2$ may be, for example, in the range of 65° C. to 90° C., preferably in the range of 65° C. to 85° C. The thermally inducible shrinkage may be arranged to reduce a dimension of the multilayer film 100 in a first direction DIR1 between the first temperature $T_1$ and the second temperature $T_2$ having a temperature difference of 15° C. in the range of 15% to 50%, preferably in the range of 15% to 40%. Therefore, after thermally induced shrinkage, the label 900 may comprise a secondary length h2, a secondary width w2 and a secondary thickness d2. The difference between the secondary length h2 and the primary length h1 refers to the extent of thermally inducible shrinkage potential. Depending of the shape of the item to be labeled, the stretching direction DIR1 and the multilayer film 100 composition, the width w2 dimension of the label 900 in direction DIR2 may change. When the cross-sectional profile of the item in direction DIR2 remains essentially constant, the width w2 dimension of the label 900 in direction DIR2 may remain essentially the same. However, when the cross-sectional profile of the item in direction DIR2 changes along direction DIR2, the width w2 dimension of the label 900 in direction DIR2 may change accordingly. Preferably, the first temperature $T_1$ and the second temperature $T_2$ may both be in the range of 65° C. to 85° C. The degree of thermally inducible shrinkage correlates with temperature and the stretching ratio, such that a higher temperature above the initial shrinkage temperature $T_{shr}$ in general leads to increased shrinkage. In addition, a higher stretching ratio of a multilayer film in general leads to higher thermally inducible shrinkage potential.

Figure 5:
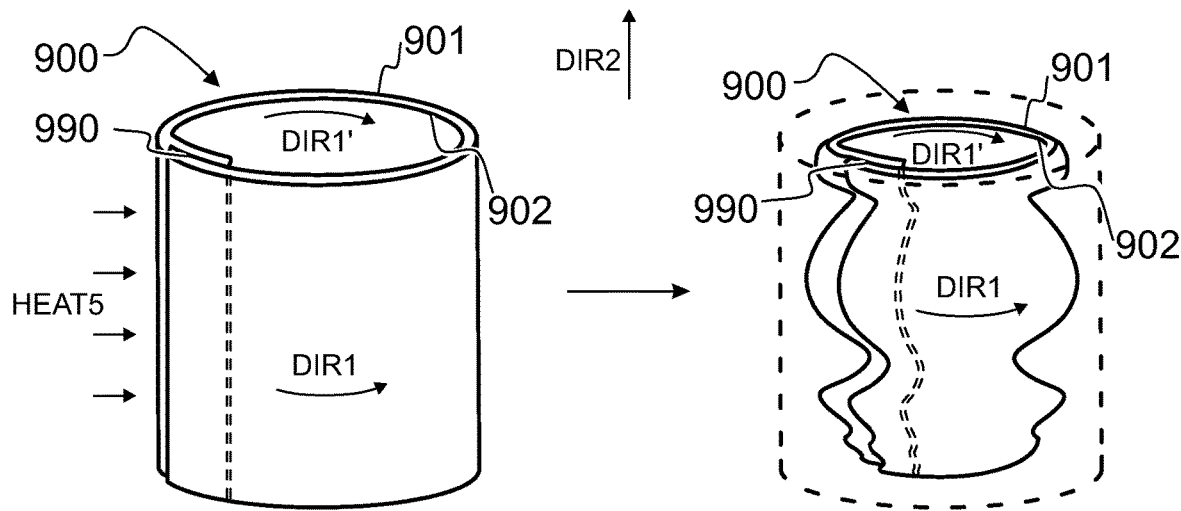
FIG. 5 shows an example embodiment of a thermally induced shrinkage of a label.

FIG. 5 shows an example embodiment of a thermally induced shrinkage for a label. A label 900 comprising thermally inducible shrinkage potential may be obtained from a multilayer film stretched in a first direction DIR1. The label 900 may be wrapped around an item to form a seam 990 comprising overlapping areas of the first surface 901 and the second surface 902. The overlapping areas of the tubular film may be seamed by a suitable means, such as laser welding or using an adhesive. When the first direction DIR1 of stretching of a thermally inducible shrinkable multilayer film is in a transversal direction, a length of the multilayer film in a second direction DIR2 may first be cut and wrapped around a cylindrical body, such as a mandrel, for seaming said length of multilayer film prior to cutting a shrink sleeve label. In particular, on transversally stretched shrink sleeves, an adhesive solvent may be used to attach overlapping surfaces of a multilayer film to form the seam. An adhesive solvent is a solvent, which melts the overlapping outer surfaces 901, 902 of the film sufficiently for the surfaces 901, 902 to attach against each other. As an alternative for a solvent, a UV curable hot melt adhesive may be used for the seaming. By providing heat HEAT5 to a seamed label 900 cut from the multilayer film, for example in a shrink tunnel, such that the label is heated to a temperature equal to or higher than the initial shrinkage temperature $T_{shr}$, the label 900 may be shrinked, The principal direction of shrinkage DIR1' is a direction parallel to the first direction DIR1 of stretching. When disposed around the outer surface of the item, the shrinkage of the round sleeve may follow the contours of the item surface such that a shrink tension is formed to hold the sleeve in place against the labeled item.

The stretching may be performed in a single direction DIR1 of the film, such as in machine direction, which refers to the longitudinal direction of the film in the production process. Films stretched in machine direction may be referred to as machine direction oriented (MDO) films. In MDO films the polymer chains are oriented monoaxially in the machine direction. Machine direction oriented films may be used for roll-fed labelling, i.e. in a labelling process where the film may be supplied from a reel, printed, cut into sheets referred to as labels and mounted around an item and seamed during the labelling step. The seaming may be done by various means, such as by using an adhesive, or a laser welding method, for example. The adhesives may be, for example, hot-melt adhesives or ultra-violet curable hot-melt adhesives.

In general, the flow rate properties of the polymer compounds and/or blends used on a multilayer film 100 may determine the stretching capability and quality of the multilayer film 100 to a significant extent. In particular, the melt flow rate (MFR) of each polymer is preferably matched to similar levels, to obtain even flow of the molten mass on an extruder. The melt flow rate is a measure of the ease of flow of melted plastic, such as a polymer compound in a melted state. Melt flow rate is inversely proportional to shear viscosity. The melt flow rate of plastics may be determined according to a ISO 1133:2005 standard. In addition to the melt flow rate, glass transition temperature may be used to characterize the processability of polymer compounds in the manufacturing of a multilayer film 100. In temperatures above the glass transition temperature, polymer chains may slide past each other more easily when a force is applied. As a rule of thumb, the glass transition temperature of the polymer compound defines to a large extent the lower temperature, where a multilayer film 100 consisting of the polymer compound may be stretched. In a similar manner, a blend of compounds may be stretched in a temperature equal to or higher than the glass transition temperature of any of the polymer compounds in the multilayer film 100. Preferably, the multilayer film 100 may be stretched in a temperature equal to or higher than at least 10° C. above the glass transition temperature of the polymer compound(s)

and/or blend(s) in the multilayer film 100. When using polymer compounds or blends having a higher glass transition temperature, the extent of stretching may be increased. However, a polymer compound having an increased glass transition temperature may also have an increased initial shrinkage temperature $T_{shr}$. The stretching temperature range, in general, may be in the same temperature range as the thermally inducible shrinkage, as during thermally induced shrinkage a multilayer film in an oriented state principally reverts towards the non-oriented (initial) state before stretching.

Heat shrinkable films may be used for labels on many applications. While a label film (face film) may have a monolayer structure, a heat shrink label preferably comprises a multilayer structure comprising heat shrink plastic film layer(s). In addition, the shrink label in general comprises at least some graphics on a surface of the face film. In addition, the shrinkable label may comprise an adhesive. The adhesive may be applied only in a joint area of cylindrical label, wherein the opposite edges of the face film are overlapping. For example, the adhesive may be applied between the overlapping edges. Alternatively or in addition, the adhesive may be applied between the face film and surface of an item to be labelled. Shrinkage of label may be focused on a local area or to the whole label area. Local shrinkage may be focused on required areas, for example on an edge area of a label. Whole label may be shrinked in a direction extending circumferentially around a container to conform to the outside (external) shape of the container. Local shrinkage may be focused on required areas, for example on an edge area of an article.

Figure 6:
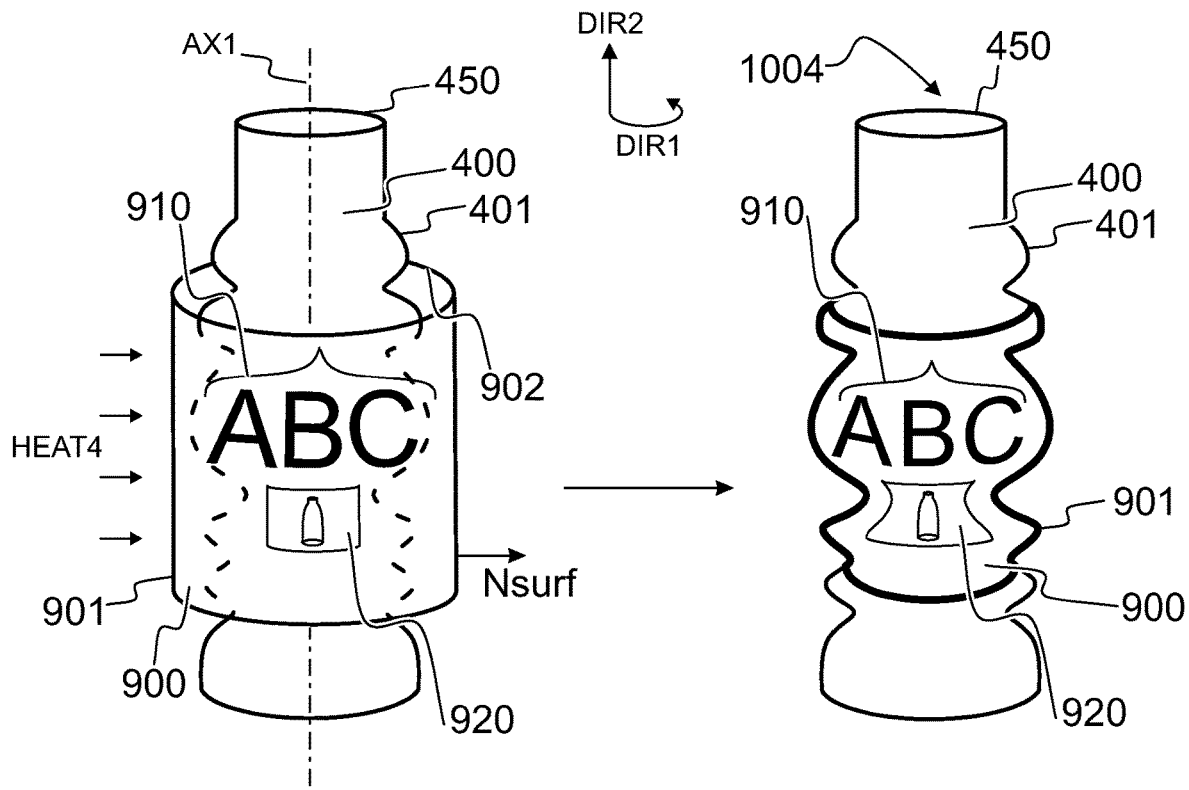
FIG. 6 shows an example embodiment of a label shrunk and fitted on a surface of an item i.e. a labelled item.

FIG. 6 shows an example embodiment of labelling an item 400 with a label 900 comprising thermally inducible shrinkage. An item 400 may comprise an outer surface 401. The item 400 may be, for example a container, such as a bottle, jar, canister or a can and may comprise a sealable opening 450. The sealable opening 450 may be used as an inlet for introduction of material, such as beverage, food, cosmetics, detergents, or other consumables. The sealable opening 450 may comprise a seal, such as a cap or a cork or a stopper to prevent the material from coming out from the interior of the item 400 during transportation or storage. The material may have been introduced into the item 400 before providing a label 900 on the item 400. The label 900 may comprise a thermally inducible shrinkage. The label may be obtained from a multilayer film, and comprises a length, width and thickness. The label may be comprise a first surface 901 and the second surface 902. The first surface 901 and the second surface 902 may be adjoined or seamed such that a first surface portion of the first surface 901 and a second surface portion of the second surface 902 may be adjoined to each other. A seamed label may form a hollow tube referred to as a sleeve. The first surface 901 may be referred to as the inner surface facing the item 400 and the second surface 902 may be referred to as the outer surface. The overlapping portions of the tubular label 900 may be seamed by any suitable means, such as laser welding, using a solvent or by using an adhesive. Furthermore, the first surface 901 of the label 900 may be attached to the surface 401 of the item 400 by an adhesive, such as a hot melt adhesive, at least from the area covering the seamed portion of the sleeve. The first surface 901 and/or the second surface 902 of the label 900 may comprise printed graphics 920. Preferably, the label 900 may comprise at least some printed graphics 920 on the first surface 901 and/or the second surface 902. The printed graphics 920 may comprise, for example, printed information 910 and/or decoration. The graphics may comprise, for example one or more colours. The labels may be printed by using printing inks. In printing on shrinkable labels with flexographic or other types of printing inks, the printing conditions, such as temperatures and chemical compatibility of the layer and the printing ink should be considered. For example, lack of solvent evaporation may cause printing ink drying related problems, while an increase in the solvent or curing temperature may cause a premature shrinkage on the multilayer film. Suitable printing ink for labels may comprise, for example a ultraviolet radiation (UV) curable printing ink or a water-based or a solvent-based printing ink. In particular, label surface material which does not require a surface treatment for printing, ultraviolet radiation (UV) curable printing ink may be suitable. When a label surface material does not require a surface treatment for printing, a solvent-based printing ink may be suitable. The label may be stretched in a first direction DIR1. The direction DIR1 of the stretching may be parallel to a multilayer film orientation direction, such as the multilayer film machine direction or the multilayer film transverse direction perpendicular to machine direction. When forming a seamed sleeve, the stretching in the first direction DIR1 may be a surface direction perpendicular to a second direction DIR2, wherein the second direction DIR2 is in general parallel or essentially parallel to the longitudinal axis AX1 of the item 400, as shown in FIG. 6. The longitudinal axis AX1 may further be defined as the direction essentially perpendicular to the surface normal $N_{surf}$ of the label 900, when a seamed tubular label is dropped on place around the item 400. A label 900 stretched above the glass transition temperature may comprise thermally inducible shrinkage potential. The label may be arranged to shrink by providing external energy HEAT4 to the label 900. A thermally shrinkable label may shrink when exposed to an elevated temperature. In general, the stretching in a first direction DIR1 and the thermally inducible shrinkage may be performed on a similar temperature range, as during thermally induced shrinkage a multilayer film in an oriented state principally reverts towards the non-oriented (initial) state before stretching. The external energy HEAT4 may be applied by various means, such as by long wavelength radiation, steam, hot air or by any combination of these. Long wavelength radiation may be, for example, infra-red range radiation. In response to the application of external energy, the thermally inducible shrinkable label may be arranged to shrink. Due to shrinkage, the second surface 902 of the label 900 is pressed against the exterior surface 901 of the item 900. Due to the tension force, a shrinkable label 900 may be arranged to provide a strengthening force for the item 900, such as a recyclable plastic container. As the printing of graphics 920 in general is performed prior to labelling an item 400, the shape and size of the printed graphics 920 may change significantly due to the shrinkage of the heat shrink label 900, as shown in FIG. 6. In particular, a suitable printing ink and printing method for thermally shrinkable multilayer films may be selected such that the shrinkage properties of the printed graphics 920 consisting of printing ink(s) after thermally induced shrinkage are of good quality. For example, the adhesion, re-wetting and shrinkage properties have an effect on the appearance of the printed graphics 920 on a label 900 surface.

The labelling may be used to obtain a labelled item 1004. A labelled item 1004 refers to a combination of a heat shrink label 900 and an item 400. The label 900 may comprise a continuous multilayer film around the external or outer surface 901 of the item 400. The continuous multilayer film may be oriented in one direction DIR1 and may comprise a core layer and a first and a second skin layers. In particular, a multilayer film may comprise mechanical, optical and thermodynamic properties, which improve the use of such a film for labels. The combination of a heat shrink label 900 and an item 400 may comprise items having outer surface 401 curvature or an uneven surface. A difference between the smallest diameter and the largest diameter of an item may be, for example between 20 and 80%. Preferably, the item 400 may comprise less surface 401 curvature, such as between 30 and 70%, for example. The manufacturing methods for many plastics allow means for providing outer surfaces 401 comprising curvature or other irregular shapes. For example, moulding methods may be used to provide plastic items having a variety of shapes. In consumer bottles, the use of polyethylene terephthalate is common. The combination of a heat shrink label 900 and an item 400 is preferred especially in applications wherein the item is a bottle consisting of polyethylene terephthalate.

Labels are increasingly used as carriers of information on various items, such as on the surfaces of moulded products or containers. The labels may be provided with means to tightly contact the surface of the label with the surface of the item, and follow the contours of the item surface. Examples of items where labels obtained from multilayer films may be used are products or containers having various shapes, such as, jars, bottles, trays, boxes, grocery containers and dairy product containers. Furthermore, shrinkable labels may be used for containers such as plastic bottles and glass jars for consumer drinks or food. The heat shrink labels may further be used for label laminates comprising an adhesive layer for attaching the label to an item. However, in particular, heat-shrink sleeves or labels may be used on recyclable plastic containers, such as PET bottles, where the recyclability of the material is pending on the ability to separate the labels from the labelled items. Materials having a density less than or more than 1.00 g/cm$^3$ may be used for separation with water. In particular, a multilayer film comprising a density less than 1.00 grams per cubic centimeter (g/cm3) may be a preferred material for thermally inducible shrinkable labels, due to floatability in water. After crushing bulky objects to small pieces for removing any air pockets, materials comprising a density of less than 1.00 g/cm$^3$ will remain on the surface of the water, whereas materials comprising a density of more than 1.00 g/cm$^3$ will sink due to specific gravity. Therefore, preferably polymer materials comprising a density of less than 1.00 g/cm$^3$, such as between 0.90 and 0.98 g/cm$^3$ may be used to obtain a multilayer film having a density less than 1.00 g/cm$^3$, preferably between 0.90 and 0.98 g/cm$^3$, most preferably between 0.90 and 0.95 g/cm$^3$.

Film Propreties and Printability

When selecting the polymer compounds for the core and the skin layers, a balance between the end use requirements and the manufacturing conditions should be considered. For example, in the end use, and in the skin layers in particular, the heat resistance of the multilayer film surface should be at least sufficiently maintained for applications requiring high temperatures in the range of 80° C. to 100° C., such as with containers filled with hot substances, such as food or beverages. Blocking refers to a permanent attachment of an multilayer film outer surface to another surface, such that the multilayer film may not be separated again. Blocking may occur, for example, during multilayer film storage. Elevated temperatures and/or increased pressure may increase the tendency for blocking, therefore an anti-blocking agent and/or a slip additive may be used for reducing the risk of blocking a wound multilayer film roll. An amount of anti-blocking agent may be in the range of 0.5 and 5% by weight, preferably in the range of 1 and 3% by weight, or between 2 and 3% by weight. Further, skin layer(s) may contain additives, such as inorganic fillers, pigments, antioxidants, ultraviolet absorbers, antistatic additives or cavitating agents to change the visual appearance or characteristics of the surface layers. Furthermore, the melting temperature of the polymer compounds may preferably be less than 125° C., such as less than 120° C., or less than 110° C., such as in the range of 60° C. to 120° C. or in the range of 80° C. to 120° C.

For printability, the surface tension of a surface should be high. A high surface tension refers to surface having a surface tension equal to or more than 36 mN/m for printability, preferably at least 38 mN/m or at least 44 dynes/cm measured according to the standard ASTM D-2578. The surface tension may be between 36 and 60 dynes/cm, preferably between 38 and 56 dynes/cm or between 44 and 50 dynes/cm. A low surface tension may lead to poor retaining capability of printing ink applied to the surface. To obtain such surface tension levels, a surface treatment may be performed on at least one skin layer surface prior to printing, such as a corona, flame or plasma treatment. Furthermore, the surface should comprise sufficient compressibility, for the printing to be absorbed and/or attached on the surface or surface layer of a multilayer film. Some polymer compounds, especially homopolymers, copolymers and terpolymers of propylene, may require a surface treatment, such as a corona, flame or plasma treatment, to increase the level of surface tension for printability. On the other hand, compounds such as cyclic olefin copolymers in general comprise high surface tension levels and do not require a surface treatment.

High printing quality comprises, for example, excellent ink adhesion and register control, allowing for example gravure and flexographic printing. The printing may be multi-layered comprising two or more printing layers. For example, colour printing at the film surface may be covered (overprinted) with a white or some other colour printing. Thus, the overprinting may be next to the surface of the item. Through this kind of label the object beneath is not visible.

Each layer in a multilayer film may be designed to improve the functionality of the multilayer film as a label. The labels in general are designed to be printable, for example by means of flexographic printing, rotogravure printing, hot-melt printing or digital printing. In particular, technologies using rolls to transfer the images, such as flexographic printing, are suitables method for medium to large series of labels. Flexographic printing may comprise the use of various types of printing inks, such as solvent-based inks, water-based inks, electron beam curing inks or ultraviolet light (UV) curing inks, to name a few.

The properties of the skin layer may be matched with the printing method. The printing method may comprise, for example, the use of a water-based or a solvent-based printing ink, ultra-violet light curable printing ink or a heat-transfer printing ink. Heat-transfer printing inks in general refer to printing inks which are solid at ambient temperature and liquid at the time of printing, and do not comprise or form volatile organic compounds (VOCs) during printing.

As an alternative, printing of a multilayer may be performed using water-based or solvent-based printing inks. When applied on a surface, the water-based or solvent-based printing ink may either dry or cure. In general, such printing inks may be dried or cured in lower temperatures than may be required for thermal transfer printing inks. In drying, the water or solvent present in the printing ink may evaporate from the surface. Furthermore, the water-based or solvent-based inks may comprise specific components to reduce drying times. Fast drying times are a requirement on processes where large series of graphics need to be printed on a multilayer film. However, while additives such as waxes, surfactants, oils, or silicone may reduce the drying time, they may also reduce the ability of the printing ink to stick to the surface of a multilayer film. In particular, this may be a problem with multilayer film surfaces having low surface tension or absorbance properties. Therefore surfaces having low surface tension or absorbance properties, such as a skin surface comprising a homopolymer, copolymer or termpolymer of propylene for example, may require a surface treatment to improve the printability.

When cured, a water-based or solvent-based printing ink may undergo cross-linking and/or polymerization reactions, which bind the ink to the printed surface. Printing ink curing may be arranged to take place, for example by evaporation of a solvent, by oxidation, by polymerization reactions due to radiation, such as ultra-violet radiation, by precipitation, or by a combination of these methods, depending of the printing ink formulation. Selection of the proper solvent(s) plays an important role in the printing of multilayer films. The choice of solvent involves more than one factor, such as evaporation rate, solution viscosity, the effectiveness of a solvent depending on its ability to adequately dissolve one material while leaving other materials unaffected A solvent in a printing ink should be compatible with the printing and the labelling process, for example not cause an adverse chemical reaction, such as welding of the first and the layers, or swelling of the printed area. In particular, the use of compatible solvent in a printing ink plays a role with shrink sleeves oriented in transverse direction, where the multilayer film may be first printed, and then seamed to a tubular form with a solvent, prior to cutting labels. An incompatible solvent may, for example cause an excessive swelling of a solvent on the printable area.

The principal raw materials of a water-based or solvent-based printing ink in general comprise a pigment, a binder, additives and a solvent. A pigment may be a solid substance that alters the appearance of an object by the selective absorption and/or scattering of light. A pigment may comprise a certain type of colour, for example, black, white or fluorescent colour. A pigment may colour the solvent-based printing ink and provide gloss, abrasiveness or resistance to light or heat or to a solvent, for example. Pigments such as extenders or opacifiers may also be used. Extenders are transparent pigments that make the colours of other pigments appear less intense. Opacifiers are pigments, which make the paint opaque (non-transparent) such that the surface below the paint cannot be seen. A binder in general refers to a resin that binds the other ingredients of a water-based or solvent-based printing ink together for a colloid. Furthermore, the binder enables the attachment of the water-based or solvent-based printing ink to a surface. In addition to pigment, a binder may contribute to gloss and resistance to heat, blocking, chemicals and water. A water-based or solvent-based printing ink may comprise more than one resin as a binder. A binder may comprise, for example, one or more of the following general types of compounds: acrylics, ketones, epoxides, polyvinylbutyral alkyds, maleics, fumarics, polyamides, cellulose derivatives, such as cellulose esters, formaldehydes, hydrocarbons, rubber resins, phenolics or polyurethanes. Additives may be used to alter the properties of the solvent-based printing ink. Additives may be, for example plasticisers to enhance the flexibility of the printed film, wax to promote rub resistance, drier to catalyse an oxidation reaction for inks dryable by oxidation, chelating agent to increase the viscosity of the ink, antioxidant to delay the onset of an oxidation polymerization, surfactant to improve wetting, stabilizing agents for pigment dispersion, alkali to control the viscosity/solubility of acrylic resins in water based inks, humectants to retard premature drying or pH modifiers. Solvents and water are used to keep the printing ink in liquid form from the period when it is applied to the printing plate or cylinder until when it has been transferred to the surface to be printed. At this point the solvent or water separates from the printing ink to allow the printed graphic to dry and bind to the surface. In particular, some printing methods, such as gravure and flexographic printing, may require a solvent that evaporates rapidly. Rapidly evaporating solvents for flexographic printing comprise, for example, ethyl acetate, isopropanol, n-propyl acetate, cyclohexanone, butoxyethanol and butyrolactone, which comprise a relatively low boiling point. The evaporation may be enhanced by curing. In particular, in flexographic printing resins based in the reaction products of a polymerized fatty acids (dimer acids) or diamines or a mixture of diamines and a terminating monocarboxylic acid may be used. The solvent in flexographic printing inks may further comprise a lower alcohol, such as ethanol, n-propanol, or isopropanol, which evaporate rapidly after printing. Flexographic printing inks may also contain some amounts of a lower aliphatic ester, such as ethyl acetate or propyl acetate.

Solvent-based and/or ultraviolet radiation (UV) curable printing inks are widely used for thermally shrinkable multilayer films. In particular, a suitable printing ink for thermally shrinkable multilayer films may shrink such that the printing after thermally induced shrinkage is of good quality.

The properties of the chemical compounds in the skin layer determine the surface energy level of the of the multilayer film. Based on the surface energy level the film may need to be surface treated. A multilayer film surface comprising a relatively low surface tension level, such as less than 38 mN/m, or less than 36 mN/m, may require a surface treatment prior to printing. A surface treatment may comprise a corona, flame or plasma treatment. When the skin layer comprises copolymer of propylene, such as a multilayer film skin layer comprising homopolymer or copolymer or terpolymer of prolylene, the dyne level in general may be increased by corona or flame-treatment for improving printability. In particular, a surface treated skin layer comprising copolymer of propylene according to an embodiment of the invention may be used for printing with ultra violet (UV) curable printing ink. Furthermore, a skin layer comprising copolymer of propylene according to an embodiment of the invention may be used for printing with a solvent-based flexographic printing ink or a gravure printing ink without a surface treatment. Further still, a multilayer film surface comprising a relatively high surface tension level, such as at least 36 mN/m, or at least 38 mN/m, such as a multilayer film skin layer comprising cyclic olefin copolymer, may not require a surface treatment prior to printing. A skin layer comprising cyclic olefin copolymer according to an embodiment of the invention may be used for printing with a ultra violet (UV) curable printing ink, a solvent-based flexographic printing ink or a gravure printing ink, without a surface treatment. In general, multilayer films according to at least some embodiments of the invention may be printed successfully with solvent-based flexographic printing ink or gravure printing ink, wherein the solvent(s) may be dried by evaporation. Solvent-based flexographic printing ink or gravure printing ink are typically not cured by using ultra violet light. Alternatively, ultra violet (UV) curable offset printing ink or ultra violet (UV) curable flexographic ink may also be used for the printing of heat-shrinkable multilayer film surfaces. When such multilayer film surface comprises homo- or copolymer of propylene, however, the multilayer film surface may need to be specially pre-treated, for example top-coated In particular, flexographic and/or rotogravure printing using printing inks comprising evaporating solvent(s) may be used with shrink label printing, when the printing ink drying by evaporation of the solvent is performed in a temperature below the initial shrinkage temperature $T_{shr}$ of the multilayer film. Drying of the printing ink at such temperatures may reduce the thermally induced stress to the multilayer films comprising thermally inducible shrinkage potential.

Furthermore, the dimensional stability and uniform thickness profile of the multilayer film prior to printing is desired. In addition to ink absorbance, dimensional stability may enhance the print register, when multiple printing inks are used to print coloured graphics or text. Between each printing ink, the film may be cured to dry the printing ink before next printing step. In addition, the multilayer film may be thermally shrinkable, which further requires that the printing on a label should be designed to match the end shape of the labelled item surface. this also requires a tendency for the multilayer film to be deformed non-permanently, or elastically. Therefore, modulus of elasticity and tensile strength may be important characteristics for the multilayer film. In particular, the stiffness, hardness and elastic properties of the compounds used on the core and skin layers of a multilayer film may control the shrinkage level and behaviour in a multilayer film comprising thermally inducible shrinkage. However, when dispensing a label, stiffness in at least one direction DIR1 is required. The direction DIR1 maybe parallel in multilayer film machine direction, or perpendicular to multilayer film machine direction. In general, higher stiffness may be desirable in the direction of the stretching.

Optical properties of a multilayer film may play a role in the selection of compatible polymers and additives. In general, haze is a property used to describe transparency of a plastic film or a label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003. The printing of a multilayer film may be performed on a first or a second surface of the multilayer film. In particular, on a shrink sleeve or a heat shrink label, the printing may be on the skin layer adjacent to a labelled container, such that the skin layers and the core layer protect the printing, for example from scratching or wearing. Furthermore, in some embodiments only a fraction of the label may comprise printing. The container may further be transparent, and the end use may require a "clear-on-clear" effect, wherein the transparency or the haze is matched between the label and the labelled item. According to an embodiment, the multilayer plastic film is clear i.e. transparent to visible light. Clear multilayer shrink films and labels comprising said films have good visual appearance. For example, said films may provide no-label look or appearance, when attached to the surface of an item. The clear no-label look allows the objects beneath such label, i.e. the bottle or contents, to be visible through such label. Clarity of the film and a label comprising said film can be measured and evaluated by the haze values.

The overall haze of the multilayer film and label consisting of said multilayer film may be less than 25%, preferably less than 15%, and most preferably less than 10% when measured according to the standard ASTM D1003. For example, the haze of the face film may be between 2 and 10%, or between 5 and 10%.

From manufacturing point of view, lower processing temperatures for the multilayer film formation by extrusion or casting may be desirable, therefore polymer compounds comprising low glass transition temperatures may be preferred. The glass transition temperatures may correlate with the mechanical properties of the multilayer film.

Definition of Chemical Compounds

Copolymers of Alpha-Olefin and Alkyl Acrylate

Copolymers of alpha-olefin and alkyl acrylate have in general been used as in the tie layer of a polymer film, in concentrations ranging between 1 to 2% by weight. However, it has now been surprisingly been found out that at least certain acrylate copolymers may in addition be suitable for core layer polymers of thermally inducible multilayer films. The core layer of a multilayer film may thus comprise a copolymer of alpha-olefin and alkyl acrylate. For example, to create polymers with a different set of properties, ethylene may be copolymerized with at least one comonomer, wherein the comonomer is an alkyl acrylate ester. The ethylene may comprise a low density polyethylene (LDPE), referring to a polyethylene having a density in the range of 0.910 to 0.940 $g/cm^3$. Examples of preferred alkyl acrylate esters suitable for use as comonomers comprise acrylic acid esters C1 to C8 linear or branched alcohols. For example, methyl acrylate, ethyl acrylate, n-butyl acrylate, iso-butyl acrylate, t-butyl acrylate, n-hexyl acrylate, 2-ethylbutyl acrylate, and 2-ethylhexyl acrylate may be used as comonomers. A particularly preferred comonomer is butyl acrylate, such as n-butyl acrylate. A copolymer of ethylene and butyl acrylates may provide good optical properties in addition to increased softness to the multilayer film, which may be used to improve the stretching properties of the multilayer film. Furthermore, the copolymer of ethylene and butyl acrylate may increase the heat resistance, such as a higher peak melting temperature, in comparison to other polymer compositions generally used in the core layer of a multilayer film, especially a thermally inducible multilayer film. Further still, multilayer film properties such as chain mobility and low temperature toughness, may be improved by increasing the butyl acrylate monomer content of the copolymer. The copolymer of ethylene and butyl acrylate may be a block or random copolymer. A preferred copolymer of ethylene and butyl acrylate may comprise in the range of 5% to 30% by weight, preferably in the range of 5 to 25% by weight, most preferably in the range of 5 to 15% or in the range of 10 to 15% by weight of butyl acrylate monomers. For example, the copolymer of ethylene and butyl acrylate may comprise a n-butyl acrylate content in the range of 5% to 30% by weight. A copolymer of ethylene and butyl acrylate may be particularly suitable as a compound in the core layer to control the free shrinkage behaviour of the film. A copolymer of ethylene and butyl acrylate may further comprise a melting temperature in the range of 96° C. to 104° C., preferably in the range of 97° C. to 103° C. In particular, a copolymer of ethylene and butyl acrylate may be used to control the stretching temperature of a multilayer film, such that the film may be stretched in a temperature in the range of 65 to 85° C., preferably in the range of 70 to 80° C. A copolymer of ethylene and butyl acrylate may further comprise a melt volume rate tested according to standard ISO 1133 at 190° C. with test load of 2.16 kg in the range of 0.20 to 1.5 g/10 min, preferably in the range 0.25 to 1.4 g/10 min. A preferred copolymer of ethylene and butyl acrylate may comprise a density in the range of 0.91 to 0.93 g/cm$^3$, preferably in the range 0.922 to 0.923 g/cm$^3$ according to standard ISO 1183 (Method A). The core layer may consist of copolymer of ethylene and butyl acrylate. A copolymer of ethylene and butyl acrylate is readily available, and has a large shrinkage potential when compared to other alkyl acrylate monomers, such as copolymers of ethylene and ethyl acrylate or methyl acrylate. The copolymer of ethylene and butyl acrylate may be preferred, in particular, in the core layer, when combining the core layer to adjacent skin layers comprising stiffness. A core layer comprising copolymer of ethylene and butyl acrylate may be particularly suitable for objects which comprise a rigid body, which supports the shape of the object. For example, copolymer of ethylene and butyl acrylate may be used on roll-fed applications, where seaming is done on a cylinder prior to application to the bottle. The seaming method may use, for example, solvent, laser, heat-seal or ultrasonic radiation. The stiffness of the label is not critical in such applications, as each item to be labeled is provided in place automatically. A copolymer of ethylene and butyl acrylate may be combined with prolylene copolymer or terpolymer to modify the properties of the core layer. In particular, by mixing copolymer of ethylene and butyl acrylate with a copolymer of ethylene and propylene, the stretching temperature of the core layer may be reduced.

Copolymer of Ethylene and Propylene

The core layer of a multilayer film may comprise alpha-olefin copolymers. In particular, copolymers of alpha-olefins comprising 2 to 10 carbon atoms may be used. The alpha-olefins may comprise, for example polymers obtained by a Ziegler-Natta catalyst or polymers having a more narrow molecular weight distribution obtained by a metallocene catalyst or other single-site catalyst. In particular, copolymers of propylene may be used, such as copolymers of propylene with ethylene and/or butene. The copolymer may comprise propylene in the range of 50% to 98% by weight, preferably at least 60% more preferably at least 70% or at least 80% by weight. For core layer, the melting point of the alpha-olefin copolymer may be in the range of 60 to 120° C., preferably in the range of 60 to 100° C., preferably less than 100° C., such as less than 90°. A preferred propylene copolymer may comprise a density in the range of 0.89 to 0.91 g/cm$^3$, preferably about 0.90 g/cm$^3$ according to standard ISO 1183 and a melt volume rate tested according to standard ISO 1133 at 230° C. with test load of 2.16 kg in the range of 1.7 cm$^3$/10 min. A preferred propylene copolymer may further comprise tensile modulus (1 mm/min) in the range of 450 to 550 Mpa, such as 500 Mpa and a tensile stress (50 mm/min) at yield in the range of 17 to 19 Mpa, such as 18 Mpa, according to standards ISO 527-1 and ISO 527-2.

Cyclic Olefin Copolymer

Cyclic olefin copolymers comprise high shrinkage potential and high surface tension for printability. Cyclic olefin copolymers in general may be used in a multilayer film, particularly in the skin layers, also due to high heat resistance, transparency and dimensional stability. A cyclic olefin copolymer refers to a polymer derived from at least one cyclic and at least one acyclic olefin, and wherein the acyclic olefin is an alpha-olefin having two or more carbon atoms. Examples of suitable alpha-olefins for multilayer films include linear alpha-olefins with two or more but no greater than 20 carbon atoms, such as, ethylene, propylene, 1-butene, 1-pentene, 1-hexene, 1-octene, 1-decene, 1-odecene, 1-tetradecene, 1-hexadecene, 1-octadecene, and 1-eicosene; branched a-olefins with 4 or more but no greater than 20 carbon atoms, such as, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene, and the like. Preferably, the cyclic olefin copolymers have been provided using a metallocene catalyst, to obtain copolymers having crystalline attributes. The molar fraction of the cyclic olefin to the acyclic olefin may be up to about 6:1. The preferred acyclic olefin is ethylene. The preferred cyclic olefin comprises at least 4 carbon atoms and an unsaturated site for coordinated polymerization with the acyclic olefin. The cyclic olefin may comprise an unsibstituted or substituted ring. A cyclic olefin copolymer may comprise an ethylene and at least one cyclic olefin selected from cyclobutene, cyclopentene, cyclooctene, norbornene, 5-methylnorbornene, 3-methylnorbornene, ethylnorbornene, phenylnorbomene, dimethylnorbornene, diethylnorbornene, dicyclopentadiene, tetracycloclododecene and methyltetracyclododecene. Alternatively, a cyclic olefin copolymer may comprise an ethylene and at least one cyclic olefin selected from norbornene, 6-methylnorbornene, 6-ethylnorbornene, 6-n-butylnorbornene, 5-propylnorbornene, 1-methylnorbornene, 7-methylnorbornene, 5,6-dimethylnorbornene, 5-phenylnorbornene, 5-benzylicnorbornene, 8-methyltetracyclo-3-dodecene, 8-ethyltetracyclo-3-dodecene, 8-hexyltetracyclo-3-dodecene, 2,10-dimethyltetracyclo-3-dodecene and 5,10-dimethyltetracyclo-3-dodecene. In particular, random copolymers of ethylene or propylene and cyclic olefin may be used. A cyclic olefin copolymer in general may comprise a high melting point, such as in the range of 235° C. to 250° C. in addition to high transparency, low haze and thermal stability. However, instead of the melting point, the glass transition temperature may be used to characterize the polymer. Depending of the cyclic olefin copolymer composition, the glass transition temperature may vary, for example, in the range of 5 to 180° C. By selecting a cyclic olefin copolymer having a higher glass transition temperature, the level of thermally inducible shrinkage may be reduced. In practice, a glass transition temperature higher than 50° C. is preferable for multilayer film labelling purposes, where the process temperature in general is in the range of 70° C. and 90° C. The effect of the cyclic olefin copolymer on the thermally inducible shrinkage on a multilayer film may be controlled by addition of a plasticiser, such as a plastomer or an elastomer. A plasticiser may be used to increase thermally inducible shrinkage of a multilayer film. By using cyclic olefin copolymers comprising different glass transition temperatures in a multilayer film, the thermodynamic and optical properties of the multilayer film may be controlled to provide desired printability and shrinkage levels.

General characteristics of cyclic olefin copolymers properties comprise

Glass transition temperatures in a wide range of temperatures, such as in the range of 5° C. to 180° C.

A high modulus of elasticity, such as in the range of 2600-3200 N/mm2

A high tensile strength, such as equal to or above 66 N/mm2

Relatively high density, such as equal to or above 1.01, for example 1.02 g/cm3

A low water uptake, such as in the range of less than 0.01%

Cyclic olefin copolymers comprise high shrinkage potential and high surface tension for printability. However, other properties, such as the density of the cyclic olefin copolymers is more than the density of other polymer species used in multilayer films, such as many copolymers of propylene. In particular, the density of cyclic olefin copolymers in general is more than the density of water, which may reduce the recyclability of films comprising large amounts of cyclic olefin copolymers. Cyclic olefin copolymers may be useful as an additive for core layers or as a component of the skin layer for multilayer film comprising copolymer of ethylene and butyl acrylate, to improve the shrinkage potential of the multilayer film at low glass transition temperatures. Furthermore, cyclic olefin copolymers may be used to provide stiffness to skin layers for multilayer film comprising copolymer of ethylene and butyl acrylate in the core layer. However, due to the processability and density, the amount of cyclic olefin copolymers is preferably small. For skin layer, according to an embodiment, this may be obtained by reducing the thickness of the skin layer such, that the thickness of the skin layer is small compared to the thickness of the core layer.

The cyclic olefin copolymers further may be difficult to process in multilayer film manufacturing. In particular, compared to polypropylene terpolymers and/or copolymers, the cyclic olefin copolymers comprise a tendency to form gels during extrusion. Cyclic olefin copolymer, as also many other polymer species, is generally provided to the manufacturing process as a spherical object, referred to as a pellet. The transportation of such pellets takes place in a container, such as a bag or a sack enveloping the pellets. Due to mechanical vibrations during the transport, the pellets may break down to smaller objects, such as a dust-like substance. This dust-like cyclic olefin copolymer comprising a smaller particle size does not melt in an extruder as the pellet. Instead, the dust-like cyclic olefin copolymer may aggregate and form gel-like formations, which may cause irregularities on the film surface. Such irregularities, or inhomogeneous core or surface layers, may not be acceptable in the end use as labels. Furthermore, these irregularities may reduce the stretching properties of the multilayer film.

LLDPE

Multilayer film skin layer comprising cyclic olefin copolymers may have a reduced resistance to oil. As human fingerprints comprise oily substances, such as fat constituents, reduced resistance to oil may lead to fingerprint marks attached in the surface of the film during manufacturing. Furthermore, when a printing and subsequent heat shrinking is carried out on a label comprising such a contaminant, the quality of the printing may be reduced. A linear low density polyethylene may be used to improve the resistance of the skin layer to oil. Furthermore, the linear low density polyethylene may be used for controlling the heat resistance and stiffness of the multilayer film. Suitable linear low density polyethylene may be used to increase the monoaxial stretching of the multilayer film, while preserving the transparency and low haze. Examples of linear low density polyethylenes are straight low density polyethylenes such as copolymers of ethylene and an alpha-olefin having 3 to 20 carbon atoms, preferably 4 to 12 carbons. For example, copolymers of ethylene and an alpha-olefin such as propylene, 1-butene, 1-pentene, 1-hexene, 1-heptene, 1-octene, 1-nonene, 1-decene, 3-methyl-1-butene or 4-methyl-1-pentene may be used. Preferably, the alpha-olefin is selected from propylene, 1-butene, 1-hexene or 1-octene. The copolymer of ethylene and an alpha-olefin may be heterogeneous, wherein the alpha-olefin may comprise one or more of the above mentioned species. In particular, a linear low density polyethylene may be a copolymer of ethylene and 1-octene having a melting temperature in the range of 120 to 125° C., preferably in the range of 122 to 124° C. and/or a melt index of 1.9 to 2.1, preferably in the range of 2.0 to 2.1.

Polyolefin Elastomer

The skin layers may comprise a polyolefin elastomer or a plastomer, such as propylene-based elastomers, ethylene based elastomers or combinations thereof. In particular, polyolefin elastomers may be used on skin layers comprising cyclic olefin copolymers to improve shrinkability and to lower the density of the skin layers. Polyolefin elastomers comprising a density in the range of 0.863 to 0.867 g/cm3, when measured according to standard ASTM D729 may be used. A polyolefin elastomer comprising a density in the range of 0.863 may be particularly suitable. The polyolefin elastomers may comprise a melt flow rate in the range of 8.0 g/10 min, when measured according to standard ASTM D1238 at 230° C./2.16 kg. Polyolefin elastomer(s) and or plastomer(s) may have a positive effect on the ability of the film to be stretched (oriented) and thus improve the shrinkage potential of the film.

For example, a skin layer may comprise equal to or less than 30% by weight, preferably equal to or less than 30% by weight of a polyolefin elastomer, wherein the polyolefin elastomer is a copolymer of propylene and ethylene having a molecular weight distribution (MWD) in the range of 2 to 3, a melt flow rate (MFR) in the range of 2 to 25 g/10 min, a density in the range of 0.858 to 0.888 g/cc, a comonomer content in the range of 5 to 15% by weight, a glass transition temperature in the range of −15 to −35° C., a melting range in the range of 50 to 135° C. and a flexural modulus in the range of 10 to 280 MPa.

Terpolymer of Propylene

Copolymers or terpolymers of propylene may be used to enhance the softness and transparency of the core and/or the skin layer of a multilayer film. In particular, propylene terpolymers may comprise a good balance between optical properties and sealing properties combined with good shrinkage properties and softness. A terpolymer of propylene refers to a copolymer comprising three distinct monomers, of which one is propylene. A propylene terpolymer may contain at least 65 mol-% of propylene monomer units.

A propylene terpolymer suitable for multilayer films may comprise alkyl monomer units having 1 to 14 carbon atoms. A propylene terpolymer suitable for multilayer films may further comprise more than one alpha-olefin co-monomer, for example ethylene, 1-butene, 1-hexene or 1-octene. A propylene terpolymer suitable for multilayer films may comprise at least one of:

a terpolymer of ethylene, propylene and 1-butene;
a terpolymer of ethylene, propylene and 1-hexene; and
a terpolymer of ethylene, propylene and 1-octene.

1-butene/propylene/ethylene terpolymer may comprise more 1-butene monomer units when compared to the propylene/ethylene/1-butene. Propylene terpolymer may have a density of 0.90 g/cm3, when measured according to standard ISO 1183. Melt flow rate may be in the range of 3 to 20 g/10 min, preferably in the range of 5 to 15 g/10 min, such as in the range of 5.5 g/10 min, when measured according to standard ISO 1133 at 230° C./2.16 kg. Alternatively the melt flow rate may be 0.9 g/10 min. For terpolymer comprising propylene, the haze measured on 50 micron thickness cast film may be lower than 10%, preferably lower than 5%, more preferably lower than 3%.

An amount of terpolymer(s) may be between 20 and 95 wt. %, preferably between 40 and 90, more preferably between 50 and 80 wt. %. For example 50, 55, 60, 65, 70, 75 or 80 wt. %. Terpolymer(s) may have effect on the orientation behaviour of the film. Terpolymer(s) may reduce the softening point of the film thus improving the stretching of the film. For example, films comprising terpolymer(s) may be stretched at a lower temperature. In addition, higher orientation ratios may be achieved, which may have effect on the shrinkage potential of the film. In a core layer of the film terpolymer(s) may have an effect on increasing the strength of the film. In addition, terpolymer(s) may have an effect on providing more stability for the film, which is advantageous, particularly for orientation in the transverse direction. When compared to cyclic olefin copolymers, copolymers and terpolymers of propylene may be preferred due to easier processability (less dusting), and lower density. By replacing cyclic olefin copolymers in the skin layer with, for example, terpolymers of propylene, the overall density of the multilayer film may be reduced for improved floatability in water.

Layer Compositions

According to an example embodiment, a multilayer film for labeling may comprise a first skin layer, a second skin layer and a core layer between the first skin layer and the second skin layer, wherein at least one of the first skin layer and the second skin layer comprises cyclic olefin copolymer and the core layer comprises copolymer of ethylene and butyl acrylate. In particular, the multilayer film may comprise a thermally inducible shrinkage potential.

According to an example embodiment, the amount of copolymer of ethylene and butyl acrylate in the core layer may be equal to or more than 10% by weight, preferably equal to or more than 15% by weigh. The amount of copolymer of ethylene and butyl acrylate in the core layer may be equal to or more than 90% by weight, preferably equal to or more than 95% by weight, most preferably equal to or more than 98% by weight. According to an example embodiment, the core layer may consist of a copolymer of ethylene and butyl acrylate.

According to another example embodiment, a multilayer film for labeling may comprise a first skin layer, a second skin layer and a core layer between the first skin layer and the second skin layer, wherein at least one of the first skin layer and the second skin layer comprises cyclic olefin copolymer and the core layer comprises propylene terpolymer. The amount of propylene terpolymer in the core layer may be, for example in the range of 20 to 80% by weight, preferably in the range of 25 to 75% by weight, most preferably in the range of 30 to 70% by weight. In particular, the multilayer film may comprise a thermally inducible shrinkage potential.

According to another example embodiment, the core layer may further comprise cyclic olefin copolymer. The core layer may comprise cyclic olefin copolymer in addition to comprising copolymer of ethylene and/or butyl acrylate or propylene terpolymer. The amount of cyclic olefin copolymer may be equal to or less than 15% by weight, preferably in the range of 0.01 to 15% by weight, most preferably in the range of 1 to 10% by weight. The cyclic olefin copolymer in the core layer in residual amounts as above may enhance the mechanical and/or the optical properties of the core layer.

The core layer may comprise further comprise copolymer of ethylene and butyl acrylate and propylene terpolymer. For example, the core layer may comprise copolymer of ethylene and butyl acrylate in the range of 10 to 90% by weight, preferably in the range of 15 to 85% by weight, most preferably in the range of 20 to 80% or in the range of 30 to 70% by weight. Consequently, the core layer may comprise propylene terpolymer in the range of 90 to 10% by weight, preferably in the range of 85 to 15% by weight, most preferably in the range of 80 to 20% or in the range of 70 to 30% by weight. Therefore, a multilayer film for labeling may comprise a first skin layer, a second skin layer and a core layer between the first skin layer and the second skin layer, wherein at least one of the first skin layer and the second skin layer comprises cyclic olefin copolymer and the core layer comprises copolymer of ethylene and butyl acrylate and/or propylene terpolymer.

According to another example embodiment, the core layer may further comprise polyolefin elastomer. The core layer may comprise polyolefin elastomer in addition to comprising copolymer of ethylene and butyl acrylate or propylene terpolymer. The amount of polyolefin elastomer may be equal to or less than 30% by weight, preferably in the range of 0.01 to 30% by weight, most preferably in the range of 1 to 20% by weight.

According to an example embodiment, at least one of the first skin layer and the second skin layer may comprise cyclic olefin copolymer equal to or more than 90% by weight, preferably equal to or more than 95% by weight, most preferably equal to or more than 98% by weight. For skin layers comprising cyclic olefin copolymer, a preferable thickness of the first skin layer and the second skin layer is equal to or less than 20%, preferably equal to or less than 10%, most preferably equal to or less than 5% of a thickness of the multilayer film. In other words, referring to FIG. 1, when one or more skin layers 110,120 comprise cyclic olefin copolymer, preferably the core layer 130 thickness d130 is at least 80%, preferably at least 90% more preferably at least 95% of the total thickness d1 of the multilayer film 100.

According to an example embodiment, at least one of the first skin layer and the second skin layer may further comprise linear low density polyethylene equal to or less than 30% by weight, preferably equal to or less than 10% by weight.

According to an example embodiment, at least one of the first skin layer and the second skin layer may further comprise polyolefin elastomer equal to or less than 10% by weight.

The first skin layer and/or the second skin layer may further comprise anti-blocking agent and/or a slip additive in the range of 0.5 to 5% by weight, preferably in the range of 1 to 3% by weight, preferably less than 3% by weight. Further, skin layer(s) may contain other additives, such as inorganic fillers, pigments, antioxidants, ultraviolet absorbers, antistatic additives or cavitating agents to change the visual appearance or characteristics of the surface layers.

EXAMPLE 1

According to an embodiment, to obtain a multilayer film comprising
a density of 0.95 g/cm$^3$,
a core layer comprising 90% of the total thickness of the multilayer film,
a first skin layer comprising 5% of the total thickness of the multilayer film, and
a second skin layer comprising 5% of the total thickness of the multilayer film
the core layer may comprise
100% by weight of copolymer of ethylene and butyl acrylate,
the first skin layer may comprise
98% by weight of cyclic olefin copolymer, and
2% by weight of antiblocking agent, and the second skin layer may comprise
- 98% by weight of cyclic olefin copolymer, and
- 2% by weight of antiblocking agent, wherein the copolymer of ethylene and butyl acrylate may comprise a density of 0.922 g/cm$^3$, a melt flow rate of 1.4 g/10 min (190° C./2.16 kg), a tensile stress at break of 12 Mpa, a flexural modulus of 50 Mpa, and a melting temperature of 97° C., and, wherein the cyclic olefin copolymer may comprise a density of 1.01 g/cm$^3$, a a first melt volume rate of 6.0 cm$^3$/10 min (230° C./2.16 kg) and a second melt volume rate of 1.0 cm$^3$/10 min (190° C./2.16 kg), a glass transition temperature of 65° C. (10° C./min, ISO 11357-1, -2, -3), a tensile modulus in the range of 2400 Mpa (1 mm/min), a tensile stress at yield (50 mm/min) in the range of 56 Mpa, and, wherein the antiblocking agent may comprise a specific gravity of 0.950 g/cm$^3$, a melt flow rate in the range of 2.5 to 3 g/10 min (190° C./2.16 kg), and a blocking force of 7.5 g/100 cm$^2$.

EXAMPLE 2

According to an embodiment, to obtain a multilayer film comprising
- a density of 0.95 g/cm$^3$,
- a core layer comprising 90% of the total thickness of the multilayer film,
- a first skin layer comprising 5% of the total thickness of the multilayer film, and
- a second skin layer comprising 5% of the total thickness of the multilayer film the core layer may comprise
- 100% by weight of copolymer of ethylene and butyl acrylate, the first skin layer may comprise
- 98% by weight of cyclic olefin copolymer, and
- 2% by weight of antiblocking agent, and the second skin layer may comprise
- 98% by weight of cyclic olefin copolymer, and
- 2% by weight of antiblocking agent, wherein the copolymer of ethylene and butyl acrylate may comprise a density of 0.923 g/cm$^3$, a melt flow rate of 0.25 g/10 min (190° C./2.16 kg), a tensile strength in the range of 22 to 26 Mpa, a tensile modulus of 120 Mpa and a melting temperature of 103° C., and, wherein the cyclic olefin copolymer may comprise a density of 1.01 g/cm$^3$, a a first melt volume rate of 6.0 cm$^3$/10 min (230° C./2.16 kg) and a second melt volume rate of 1.0 cm$^3$/10 min (190° C./2.16 kg), a glass transition temperature of 65° C. (10° C./min, ISO 11357-1, -2, -3), a tensile modulus in the range of 2400 Mpa (1 mm/min), a tensile stress at yield (50 mm/min) in the range of 56 Mpa, and, wherein the antiblocking agent may comprise a specific gravity of 0.950 g/cm$^3$, a melt flow rate in the range of 2.5 to 3 g/10 min (190° C./2.16 kg), and a blocking force of 7.5 g/100 cm$^2$.

EXAMPLE 3

According to an embodiment, to obtain a multilayer film comprising
- a density of 0.95 g/cm$^3$,
- a core layer comprising 90% of the total thickness of the multilayer film,
- a first skin layer comprising 5% of the total thickness of the multilayer film, and
- a second skin layer comprising 5% of the total thickness of the multilayer film the core layer may comprise
- 70% by weight of copolymer of ethylene and butyl acrylate, and
- 30% by weight of terpolymer of propylene, the first skin layer may comprise
- 98% by weight of cyclic olefin copolymer, and
- 2% by weight of antiblocking agent, and the second skin layer may comprise
- 98% by weight of cyclic olefin copolymer, and
- 2% by weight of antiblocking agent, wherein the copolymer of ethylene and butyl acrylate may comprise a density of 0.923 g/cm$^3$, a melt flow rate of 0.25 g/10 min (190° C./2.16 kg), a tensile strength in the range of 22 to 26 Mpa, a tensile modulus of 120 Mpa and a melting temperature of 103° C., and, wherein the terpolymer of propylene may comprise a density of 0.90 g/cm$^3$, a melt flow rate of 5.5 g/10 min (230° C./2.16 kg), a tensile stress at break in the range of 37 to 41 Mpa, a tensile Young modulus in the range of 250 Mpa, and a melting temperature of 128° C., and, wherein the cyclic olefin copolymer may comprise a density of 1.01 g/cm$^3$, a a first melt volume rate of 6.0 cm$^3$/10 min (230° C./2.16 kg) and a second melt volume rate of 1.0 cm$^3$/10 min (190° C./2.16 kg), a glass transition temperature of 65° C. (10° C./min, ISO 11357-1, -2, -3), a tensile modulus in the range of 2400 Mpa (1 mm/min), a tensile stress at yield (50 mm/min) in the range of 56 Mpa, and, wherein the antiblocking agent may comprise a specific gravity of 0.950 g/cm$^3$, a melt flow rate in the range of 2.5 to 3 g/10 min (190° C./2.16 kg), and a blocking force of 7.5 g/100 cm$^2$.

For the person skilled in the art, it will be clear that modifications and variations of the products and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A shrinkable multilayer film for labeling comprising a first skin layer, a second skin layer and a core layer between the first skin layer and the second skin layer, wherein the first skin layer and the second skin layer each comprise cyclic olefin copolymer, the core layer consist of propylene terpolymer and copolymer of ethylene and butyl acrylate, wherein the multilayer film is configured to shrink in a direction of orientation of the multilayer film at least 35% at a temperature range between 65 and 85° C., wherein the multilayer film is configured to shrink less than 10% at a temperature below 65° C., and wherein the copolymer of ethylene and butyl acrylate is a block or random copolymer, comprising a n-butyl acrylate content in the range of 5% to 15% by weight.

2. The multilayer film according to claim 1, wherein the copolymer of ethylene and butyl acrylate is a block or random copolymer, comprising a n-butyl acrylate content in the range of 10% to 15% by weight.

3. The multilayer film according to claim 1, wherein at least one of the first skin layer and the second skin layer comprises cyclic olefin copolymer equal to or more than 90% by weight or wherein at least one of the first skin layer and the second skin layer comprises linear low density polyethylene equal to or less than 30% by weight.

4. The multilayer film according to the claim 3, wherein the linear low density polyethylene is a copolymer of ethylene and 1-octene having a melting temperature in the range of 120 to 125° C. and/or a melt index of 1.9 to 2.1.

5. The multilayer film according to claim 1, the multilayer film comprising a surface tension level on a first surface of the skin layer higher than or equal to 38 mN/m.

6. The multilayer film according to claim 1, wherein a thickness of the first skin layer and the second skin layer is equal to or less than 20% of a thickness of the multilayer film.

7. The multilayer film according to claim 1, comprising an average thickness in the range of 20 to 60 micrometers after monoaxially stretched in the range of 4 to 7 times and slitted.

8. The multilayer film according to claim 1, comprising a shrink force in the orientation direction of the multilayer film during heating at temperatures between 60 and 98° C. of less than 10 N/15 mm.

9. A label comprising a length, a width and a thickness dimension, the label derived from the multilayer film according to claim 1.

10. A method for obtaining a shrinkable multilayer film for thermally inducible shrink labels, the method comprising:
providing a first skin layer and a second skin layer, wherein the first skin layer and the second skin layer each comprise cyclic olefin copolymer,
providing a core layer between the first and the second skin layer, wherein the core layer consists of propylene terpolymer and copolymer of ethylene and butyl acrylate, wherein the copolymer of ethylene and butyl acrylate is a block or random copolymer, comprising a n-butyl acrylate content in the range of 5% to 15% by weight,
stretching the multilayer film in the range of 4 to 7 times in a first direction for obtaining monoaxially stretched multilayer film having a tension in the first direction, and
cooling the multilayer film to room temperature;
wherein the multilayer film is configured to shrink in a direction of orientation of the multilayer film at least 35% at a temperature range between 65 and 85° C.;
and wherein the multilayer film is configured to shrink less than 10% at a temperature below 65° C.

11. The method according to claim 10, wherein the core layer consists of 30 to 70% propylene terpolymer and 30 to 70% copolymer of ethylene and butyl acrylate.

12. The method according to claim 10, further comprising providing a surface treatment for the multilayer film surface for increasing the surface tension of the first skin layer or the second skin layer.

13. The method according to claim 10, wherein the first skin layer and the second skin layer have been provided by extrusion or casting.

14. The method according to claim 10, wherein the first direction is parallel or perpendicular to the multilayer film machine direction.

15. The multilayer film according to claim 1, wherein the core layer consists of 30 to 70% propylene terpolymer and 30 to 70% copolymer of ethylene and butyl acrylate.

* * * * *